United States Patent
Suzuki

(10) Patent No.: US 6,944,156 B2
(45) Date of Patent: Sep. 13, 2005

(54) LABEL REQUEST PACKET TRANSMISSION METHOD, PACKET TRANSFER NETWORK AND METHOD THEREOF, AND PACKET TRANSFER DEVICE

(75) Inventor: Makoto Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 869 days.

(21) Appl. No.: 09/812,843

(22) Filed: Mar. 21, 2001

(65) Prior Publication Data

US 2001/0028648 A1 Oct. 11, 2001

(30) Foreign Application Priority Data

Mar. 22, 2000 (JP) ........................................ 2000-079544

(51) Int. Cl.⁷ .......................... H04L 12/28; H04L 12/56
(52) U.S. Cl. ..................... 370/389; 370/473; 370/474
(58) Field of Search ................................ 370/389, 360, 370/386, 471, 473, 474, 476, 464, 465, 392, 390, 400, 409, 401, 254, 277, 310, 310.1, 432, 352, 230, 396, 397, 398, 399, 395.2, 395.5, 395.3, 395.53, 395.31, 905; 398/51, 79; 709/238, 240, 241, 242

(56) References Cited

U.S. PATENT DOCUMENTS

| | | | | |
|---|---|---|---|---|
| 6,108,708 | A | 8/2000 | Iwata | 709/238 |
| 6,108,739 | A * | 8/2000 | James et al. | 710/113 |
| 6,408,001 | B1 * | 6/2002 | Chuah et al. | 370/392 |
| 6,452,942 | B1 * | 9/2002 | Lemieux | 370/468 |
| 6,466,985 | B1 * | 10/2002 | Goyal et al. | 709/238 |
| 6,483,833 | B1 * | 11/2002 | Jagannath et al. | 370/392 |
| 6,490,292 | B1 * | 12/2002 | Matsuzawa | 370/401 |
| 6,498,793 | B1 * | 12/2002 | Haviland | 370/394 |
| 6,530,032 | B1 * | 3/2003 | Shew et al. | 714/4 |
| 6,665,273 | B1 * | 12/2003 | Goguen et al. | 370/252 |
| 6,683,874 | B1 * | 1/2004 | Nagami et al. | 370/392 |
| 6,735,190 | B1 * | 5/2004 | Chuah et al. | 370/352 |

FOREIGN PATENT DOCUMENTS

| | | |
|---|---|---|
| JP | 1-120928 | 5/1989 |
| JP | 2861771 | 12/1998 |
| JP | 11-317749 | 11/1999 |

OTHER PUBLICATIONS

"Estimation of a Label Distribution Protocol for Label Switching" Nobuhiro Senba, Kouji Nishimura and Reiji Albara; Nov. 21, 1997; vol. 91, No. 111, pp. 25–31.
English Abstract of "Estimation of a Label Distribution Protocol for Label Switching".
Rosen et al., "Multiprotocol Label Switching Architecture", *Network Working Group Internet Draft*, pp. 1–58, (2001).
Magd et al., "Constraint–Based LSP Setup Using LDP", *MPLS Working Group Internet Draft*, pp. 1–35, (2001).

* cited by examiner

*Primary Examiner*—Wellington Chin
*Assistant Examiner*—Jamal A. Fox
(74) *Attorney, Agent, or Firm*—Foley & Lardner LLP

(57) ABSTRACT

A packet transfer device including a first LDP multiplexing and separation unit connected to a first transmission path, a second LDP multiplexing and separation unit connected to a second transmission path, a packet switch provided between the first LDP separation unit and the second LDP processing unit, a switch connection table for controlling a switch connection state of the packet switch, and an LDP processing unit connected to the first and second LDP multiplexing and separation units and the switch connection table, in which the LDP processing unit processes an LDP packet separated at the first LDP multiplexing and separation unit to multiplex a plurality of LDP packets each for each of a plurality of divisional sections obtained by dividing a packet transfer network and sends the multiplexed packet to the second LDP multiplexing and separation unit, as well as updating the switch connection table.

20 Claims, 14 Drawing Sheets

LABEL REQUEST PACKET

LABEL ALLOCATION PACKET

STATE NOTIFICATION PACKET

FIG. 7

|  | INPUT SIDE | | OUTPUT SIDE | |
|---|---|---|---|---|
|  | TRANSMISSION PATH | LABEL VALUE | TRANSMISSION PATH | LABEL VALUE |
| ENTRY 1 | 101 | 1 | 102 | 5 |
| ENTRY 2 | 102 | 3 | 101 | 4 |

DEVICE 603 SWITCH CONNECTION TABLE

|  | INPUT SIDE ||  OUTPUT SIDE ||
|---|---|---|---|---|
|  | TRANSMISSION PATH | LABEL VALUE | TRANSMISSION PATH | LABEL VALUE |
| ENTRY 1 | DEVICE 602 SIDE | 0X01 | DEVICE 604 SIDE | 0X01 |
| ENTRY 2 | DEVICE 604 SIDE | 0X01 | DEVICE 602 SIDE | 0X01 |
| ENTRY 3 | DEVICE 602 SIDE | 0X02 | DEVICE 604 SIDE | 0X02 |
| ENTRY 4 | DEVICE 604 SIDE | 0X02 | DEVICE 602 SIDE | 0X02 |

FIG. 10

DEVICE 604 SWITCH CONNECTION TABLE

|  | INPUT SIDE ||  OUTPUT SIDE ||
|---|---|---|---|---|
|  | TRANSMISSION PATH | LABEL VALUE | TRANSMISSION PATH | LABEL VALUE |
| ENTRY 1 | DEVICE 603 SIDE | 0X02 | DEVICE 605 SIDE | 0X02 |
| ENTRY 2 | DEVICE 605 SIDE | 0X02 | DEVICE 603 SIDE | 0X02 |

FIG. 11

DEVICE 605 SWITCH CONNECTION TABLE

|  | INPUT SIDE | | OUTPUT SIDE | |
|---|---|---|---|---|
|  | TRANSMISSION PATH | LABEL VALUE | TRANSMISSION PATH | LABEL VALUE |
| ENTRY 1 | DEVICE 604 SIDE | 0X02 | DEVICE 607 SIDE | 0X02 |
| ENTRY 2 | DEVICE 607 SIDE | 0X02 | DEVICE 604 SIDE | 0X02 |

FIG. 12

DEVICE 601 SWITCH CONNECTION TABLE

|  | DESTINATION TERMINAL | TRANSMISSION TERMINAL | LABEL VALUE ON DEVICE 602 SIDE |
|---|---|---|---|
| ENTRY 1 | TERMINAL 612 | TERMINAL 611 | 0X00 |
| ⋮ | ⋮ | ⋮ | ⋮ |

FIG. 13

DEVICE 608 SWITCH CONNECTION TABLE

|  | DESTINATION TERMINAL | TRANSMISSION TERMINAL | LABEL VALUE ON DEVICE 607 SIDE |
|---|---|---|---|
| ENTRY 1 | TERMINAL 612 | TERMINAL 611 | 0X03 |
| ⋮ | ⋮ | ⋮ | ⋮ |

LABEL REQUEST PACKET OF DEVICE 1001

LABEL ALLOCATION PACKET OF DEVICE 1005

STATE NOTIFICATION PACKET

→ (RIGHTWARD ARROW) LABEL REQUEST PACKET

← (LEFTWARD ARROW) LABEL ALLOCATION PACKET

←✗ (LEFTWARD ARROW) STATE NOTIFICATION PACKET

LABEL REQUEST PACKET TRANSMISSION METHOD, PACKET TRANSFER NETWORK AND METHOD THEREOF, AND PACKET TRANSFER DEVICE

BACKGROUND OF THE INVENTION

1. Field of the Invention

The present invention relates to a packet transfer network in which packet transfer between a through a plurality of packet transfer devices provided therebetween and, more particularly, to a method of transmitting a label request packet for use in determining a label to be used among a plurality of packet transfer devices for packet transfer from a transmission side packet transfer device connected to a first terminal to a reception side packet transfer device connected to a second terminal.

2. Description of the Related Art

With reference to FIG. 16, a conventional packet transfer network will be described. The packet transfer network shown in FIG. 16 is a network in which first a label is determined according to a procedure called LDP (Label Distribution Protocol) among packet transfer devices to transfer a packet for inter-terminal communication with a determined label attached to the head thereof, thereby achieving high-speed packet transfer as recited in IETF Internet Draft "Multiprotocol Label Switching Architecture".

FIG. 3 shows one example of such a packet with a label. More specifically, a labeled packet is composed of a communication packet and a label for transfer within a network. One kind of labeled packet is an ATM (Asynchronous Transfer Mode) cell. As is well known, an ATM cell has 53 bytes, of which 5 bytes form a header (cell header) and 48 bytes form an information field. A cell header includes a VCI (Virtual Channel Identifier) for identifying a connection to which an ATM cell belongs and a VPI (Virtual Path Identifier). The VCI and the VPI are among kinds of labels. A packet transfer device may divide a packet received from a terminal into a plurality of ATM cells and transmit the same.

The packet transfer network of this example is a packet transfer network having a first terminal 1011 and a second terminal 1012, between which first to fifth packet transfer devices 1001, 1002, 1003, 1004 and 1005 are provided. A packet transfer device selected as a route (path) is also called a repeating installation. In the illustrated example, the first terminal 1011 operates as a transmission terminal and the second terminal 1012 operates as a destination terminal.

In the following, description will be made of a procedure of determining a label for use among the first to fifth repeating installations (packet transfer devices) 1001 to 1005 for the packet transfer between the first terminal 1011 and the second terminal 1012 in particular with respect to an example recited in IETF Internet Draft "Constraint-Based LSP Setup Using LDP".

In the figure, a packet transfer device (repeating installation) is indicated simply as a device. It should be noted here that a label is determined (allocated) for a link (path) between packet transfer devices (repeating installations) adjacent to each other. In addition, there are cases where the same label is allocated both for an up-direction and a down-direction and where different labels are allocated to them.

FIG. 17 to 19 show packets to be transferred between the first and the second terminals 1011 and 1012 for determining a label. FIG. 17 shows a label request packet, FIG. 18 shows a label allocation packet and FIG. 19 shows a state notification packet. The label allocation packet and the state notification packet are generally referred to as response packets. FIG. 20 shows a flow of operation of the packet transfer network illustrated in FIG. 16.

Assume that the first repeating installation 1001 receives a first packet from the first terminal 1011 as a transmission terminal to the second terminal 1012 as a destination terminal or a request is made by a network manager for the connection between the first terminal 1011 and the second terminal 1012. In this case, the first repeating installation 1001 is allowed to select one of a plurality of paths reachable from the first terminal 1011 to the second terminal 1012 to transmit a label request packet along the selected path. It is assumed here that a selected path passes through the second repeating installation 1002 and the fourth repeating installation 1004. In this case, the first repeating installation 1001 examines a label use condition of a link (transmission path) on the side of the second repeating installation 1002 and when there is a label value yet to be used, transmits the label request packet shown in FIG. 17 to the second repeating installation 1002 (an arrow A1 in FIG. 20).

As shown in FIG. 17, the label request packet transmitted by the first repeating installation 1001 is composed of an LDP label and an LDP packet. The LDP packet includes a label request packet identifier, a transmission terminal identifier, a destination terminal identifier and a plurality of repeating installation identifiers. In the case of the present example, the transmission terminal identifier indicates the first terminal 1011, the destination terminal identifier indicates the second terminal 1012 and the repeating installation identifiers indicate the second and the fourth repeating installations 1002 and 1004.

The second repeating installation 1002 receives the label request packet from the first repeating installation 1001. The second repeating installation 1002, since an element at the head of the repeating installation identifiers of the received label request packet (FIG. 17) is its own device identifier (device 1002), removes the element and refers to the next repeating installation identifier (device 1004) to select the third repeating installation 1003 as a subsequent transfer destination. In addition, the second repeating installation 1002 examines a label use condition of each transmission path on the side of the first repeating installation 1001 and the side of the third repeating installation 1003. At this time, when a label value yet to be used exists, the second repeating installation 1002 removes an information element of its own device identifier from the received label request packet and transmits the obtained packet to the third repeating installation 1003 (an arrow A2 in FIG. 20).

Upon receiving the label request packet from the second repeating installation 1002, the third repeating installation 1003 refers to an element at the head of the repeating installation identifiers of the received label request packet to select the fourth repeating installation 1004 as a subsequent transfer destination. In addition, the third repeating installation 1003 examines a label use condition of each transmission path on the side of the second repeating installation 1002 and on the side of the fourth repeating installation 1004. When there exists a label value yet to be used, the third repeating installation 1003 transmits the received label request packet to the fourth repeating installation 1004 without modification (an arrow A3 in FIG. 20).

The fourth repeating installation 1004 receives the label request packet from the third repeating installation 1003.

The fourth repeating installation 1004, since the element at the head of the repeating installation identifiers of the received label request packet is its own device identifier (device 1004), removes the element. With no other information element, the fourth repeating installation 1004 refers to the destination terminal identifier in place of the elements to select the fifth repeating installation 1005 as a subsequent transfer destination. In addition, the fourth repeating installation 1004 examines a label use condition of each transmission path on the side of the third repeating installation 1003 and on the side of the fifth repeating installation 1005. When there is a label value yet to be used, the fourth repeating installation 1004 removes an information element of its own device identifier from the received label request packet and transmits the obtained packet to the fifth repeating installation 1005 (Step A4 in FIG. 20).

The fifth repeating installation 1005 receives the label request packet from the fourth repeating installation 1004. The fifth repeating installation 1005, since the destination terminal identifier indicates the second terminal 1012 which is connected directly to its own device, examines a label use condition of the transmission path on the side of the fourth repeating installation 1004. When there is a label value yet to be used, the fifth repeating installation 1005 inserts the value as an allocated label value into the label allocation packet shown in FIG. 18 and transmits the obtained packet to the fourth repeating installation 1004 (an arrow A5 in FIG. 20).

As shown in FIG. 18, the label allocation packet to be transmitted by the fifth repeating installation 105 is a packet indicative of an affirmative acknowledgment which is composed of an LDP label and an LDP packet. The LDP packet includes a label allocation packet identifier, a transmission terminal identifier, a destination terminal identifier and an allocated label. In the present example, the transmission terminal identifier indicates the first terminal 1011 and the destination terminal identifier indicates the second terminal 1012.

The fourth repeating installation 1004, upon receiving the label allocation packet from the fifth repeating installation 1005, takes out the allocated label value in a region of an allocated label. Subsequently, the fourth repeating installation 1004 stores a combination of the taken out allocated label value and the label value yet to be used on the side of the third repeating installation 1003, inserts a label value selected for the transmission path on the side of the third repeating installation 1003 into the label allocation packet and outputs the obtained packet to the third repeating installation 1003 (an arrow A6 in FIG. 20).

By the same procedure as that of the fourth repeating installation 1004, the third repeating installation 1003 and the second repeating installation 1002 output label allocation packets to the second repeating installation 1002 and the first repeating installation 1001 (arrows A7 and A8 in FIG. 20).

Upon receiving the label allocation packet from the second repeating installation 1002, the first repeating installation 1001 determines that label determination is made at all the repeating installations within the network and stores an allocated label value in the received label allocation packet. Then, the first repeating installation 1001 hereinafter attaches the label value in question to a packet bound for the second terminal 1002 which is received from the first terminal 1011 and outputs the obtained packet as a labeled packet to the second repeating installation 1002. The second, the third, and the fourth repeating installations 1002, 1003 and 1004 also replace labels of received packets based on stored label values. A labeled packet arriving at the fifth repeating installation 1005 is output to the second terminal 1012.

It is also assumed that each repeating installation receiving a label request packet examines a label use condition to find that it uses up all the labels. In this case, by transmitting such a state notification packet as shown in FIG. 19 to a repeating installation which has transmitted the label request packet, each repeating installation gives notification to the requesting source.

As illustrated in FIG. 19, the state notification packet is a packet indicative of a negative acknowledgment which is composed of an LDP label and an LDP packet. The LDP packet includes a state notification packet identifier and a state. Here, the state indicates "no label yet to be used".

A repeating installation receiving a state notification packet one after another transmits a state notification packet of the same contents to a repeating installation having transmitted a label request packet, resulting in the state notification packet reaching the first repeating installation 1001 (arrows A9 to A11 in FIG. 20).

Upon receiving the state notification packet, the first repeating installation 1001 learns that its own label request is refused anywhere in the packet transfer network to start such processing as making a label request on another path again.

Concerning the present invention, various related techniques are known. Japanese Patent Laying-Open (Kokai) No. Heisei 1-120928 (hereinafter referred to as "related art 1"), for example, discloses "Instantaneous Packet Transfer Control System" which, when a packet required to have instantaneousness is transmitted in a packet switching network, as much as possible prevents transfer of invalid packets caused by an increase in a delay time to reduce invalid load on the packet switching network as much as possible. According to the instantaneous packet transfer control system disclosed in the related art 1, in a packet switching network made up of a plurality of packet switching systems, a packet to be transmitted within the packet switching network and required to have instantaneousness is provided with a region to which delay information indicative of a delay time caused while a packet is transferred in the packet switching network is attached. At each packet switching system, a delay time indicated by delay information contained in a packet arriving through an incoming trunk line and a delay time to be added before the packet is transmitted to an outgoing trunk line are added and a result of the addition is compared with a predetermined delay threshold. The system is designed such that when the addition result is less than the delay threshold value, the delay information contained in the packet is updated and transmitted to the outgoing trunk line. Then, when the addition result is not less than the delay threshold value, the packet is abandoned.

On the other hand, Japanese Patent Laying-Open (Kokai) No. Heisei 11-317749 (hereinafter referred to as related art 2) discloses "High-Speed Connection Setting/Releasing Method and Device Therefor" which realizes improvement in a calling processing capacity of a switching system and reduction in connection delay and enables application to a large-scale network and networks connected to each other without requiring hardware for transmission and reception of a special signal for connection setting. In the related art 2, each ATM exchange has a VCC management unit for managing VCC set in advance between exchanges, a band management unit for managing a band of VP, an accommodation terminal management unit for managing correspondence between a subscriber's terminal and an accommodation ATM exchange, and a switch unit for conducting connection and disconnection of a connection. In setting and releasing a connection, a signal for use in ordinary SVC services is transferred link by link. Then, at transmission side and reception side ATM exchanges, connection is set or released by connecting or disconnecting a VC captured on the side of a subscriber/on the side of other network and a repeating connection set in advance between the reception and transmission side exchanges.

Furthermore, Japanese Patent No. 2861771 (hereinafter referred to as related art 3) discloses "Signaling System Using Logical Repeating Path Information" which enables application to a large-scale network and setting and disconnection of a connection at a high-speed in a terminal connection/disconnection control procedure (signaling) system at a connection-oriented packet network. More specifically, according to the first mode of the related art 3, a transmission terminal has information about a logical repeating path from its own terminal to a reception terminal which is expressed as a pair of a physical port number and a logical multiple channel number, and a table of correspondence to an address of the reception terminal. Then, using logical repeating path information corresponding to the reception terminal which is indicated in the table, signaling is conducted. In addition, immediately after signaling is conducted by the transmission terminal using the logical repeating path information, the transmission terminal conducts data transfer before the reception terminal returns an acknowledgment of a logical channel connection. According to the second mode of the related art 3, a switch has information about a logical repeating path from its own switch to a reception terminal which is expressed as a pair of a physical port number and a logical multiple channel number, and a table of correspondence to an address of the reception terminal. Then, at the time of sending a signaling packet from a transmission terminal to the switch by using a reception terminal address, the switch, using the above-described table, converts a signaling packet using the reception terminal address into a signaling packet using the information about a logical repeating path from the switch to the reception terminal to conduct signaling. In addition, when the transmission terminal conducts signaling using a destination address, the transmission terminal conducts data transfer immediately after a switch accommodated in the transmission terminal returns an address conversion completion signal and before the reception terminal returns an acknowledgment of a logical channel connection. Moreover, when the transmission terminal conducts signaling using a destination address, the transmission terminal conducts data transfer immediately after a switch accommodated in the transmission terminal returns an address conversion completion signal and before the reception terminal returns an acknowledgment of a logical channel connection. In addition, a reference number is attached to logical repeating path information held by a switch, whereby the transmission terminal conducts signaling using the reference number. Moreover, in the above-described first and second modes, a logical output path is represented by a reference number and based on logical repeating path information obtained by linking the reference numbers, the transmission terminal conducts signaling.

The above-described conventional packet transfer networks, however, have the following problems.

The first problem is that because a label request packet is sequentially processed on and propagated through packet transfer devices (repeating installations) on a path, a waiting time of a packet transfer device (repeating installation) near a destination terminal for receiving a label request packet is increased.

The second problem is that because of the same cause as that of the first problem, time is increased for waiting for a label allocation packet or a state notification packet which are results (response packet) corresponding to a label request packet to return to a packet transfer device (repeating installation) as a transmission source of the label request packet.

The above-described related art 1 discloses only a technical idea of attaching delay information to a packet and discloses none of label request packet transmission methods. The related art 2 discloses only a technical idea of reducing the volume of processing related to header conversion table setting to improve a calling processing capacity of an exchange and reduce connection delay without requiring hardware for transmitting and receiving a special signal for connection setting and as well as the above-described related art 1 and 2, discloses none of label request packet transmission methods. Furthermore, the related art 3 disclosed only a signaling system using logical repeating related art 1 and 2, disclosed none of label request packet transmission methods.

SUMMARY OF THE INVENTION

An object of the present invention is to provide a packet transfer network enabling reduction in time for waiting for packet communication to start and time for waiting for refusal detection by speeding up LDP processing of the entire packet transfer network.

According to the first aspect of the invention, in a packet transfer network for conducting packet transfer between a first terminal and a second terminal through a plurality of packet transfer devices provided between the terminals, a label request packet transmission method of transmitting an original label request packet for use in determining a label to be used among said plurality of packet transfer devices for the purpose of said packet transfer from a transmission side packet transfer device connected to said first terminal and a reception side packet transfer device connected to said second terminal, comprising the steps of:

dividing said packet transfer network into a plurality of sections, and dividing said original label request packet into a plurality of label request packets each for each said section and transmitting the divisional packets.

In other words, the packet transfer device according to the present invention reduces an accumulated label request packet propagation delay time by transmitting, to each packet transfer device indicated by a repeating installation identifier of a received label request packet, the divisional label request packets obtained by dividing the label request packet each for a section partitioned by the packet transfer device indicated by the repeating installation identifier. In addition, the packet transfer device according to the present invention reduces a label determination time for packet transfer to reduce a waiting time for packet communication to start by synthesizing a label allocation packet or a state notification packet which will be a response packet to these label request packets to determine whether a label request for the entire path between terminals is allowed or not.

Thus, when receiving a label request packet, the packet transfer device according to the present invention regenerates a label request packet for each packet transfer device indicated by a repeating installation identifier in the received packet and transmits the obtained packet, so that label request packet transfer in each section partitioned by a repeating installation identifier is executed in parallel to shorten a time for all the devices on a path to receive a label request packet. In addition, since in the same manner, a result of each section is individually notified by a label allocation packet or a state notification packet, a time required for determining a processing result is short. Accordingly, it is possible to reduce a time for starting actual communication after transmission of a label request packet.

In the preferred construction, division into said plurality of label request packets each for each said section is conducted by a specific representative packet transfer device at a section to which said transmission side packet transfer device belongs.

In another preferred construction, said specific representative packet transfer device transmits said plurality of divisional label request packets each for each said section directly to a plurality of other representative packet transfer devices in the remainder of the plurality of sections in parallel to each other.

In another preferred construction, said specific representative packet transfer device transmits said plurality of divisional label request packets each for each said section directly to a plurality of other representative packet transfer devices in the remainder of the plurality of sections in parallel to each other, and each said representative packet transfer device is disposed at a starting point of a path in the section to which the representative packet transfer in question belongs.

In another preferred construction, said specific representative packet transfer device transmits said plurality of divisional label request packets each for each said section directly to a plurality of other representative packet transfer devices in the remainder of the plurality of sections in parallel to each other, and each said representative packet transfer device is disposed at boundaries between said sections adjacent to each other.

In another preferred construction, said specific representative packet transfer device transmits said plurality of divisional label request packets each for each said section directly to a plurality of other representative packet transfer devices in the remainder of the plurality of sections in parallel to each other, and each of said plurality of other representative packet transfer devices, upon receiving a label request packet addressed to the device of its own, sequentially transmits, within a section to which its own device belongs, the received label request packet to a packet transfer device belonging to the section in question.

According to the second aspect of the invention, a packet transfer network for conducting packet transfer between a first terminal and a second terminal through a plurality of packet transfer devices provided between the terminals, in which a transmission side packet transfer device connected to said first terminal transmits an original label request packet for use in determining a label to be used among said plurality of packet transfer devices for the purpose of said packet transfer to a reception side packet transfer device connected to said second terminal, wherein said packet transfer network is divided into a plurality of partial networks, and a specific representative packet transfer device in a partial network to which said transmission side packet transfer device belongs includes:

reception means for receiving said original label request packet from said transmission side packet transfer device, and transmission means for dividing the received original label request packet into a plurality of label request packets each for each said partial network and transmitting the divisional packets.

In the preferred construction, said transmission means of said specific representative packet transfer device transmits said plurality of divisional label request packets each for each said partial network directly to a plurality of other representative packet transfer devices in the remainder of the plurality of partial networks in parallel to each other.

In another preferred construction, each said representative packet transfer device is disposed at a starting point of a path in the partial network to which the representative packet transfer in question belongs.

In another preferred construction, each said representative packet transfer device is disposed at boundaries between said partial networks adjacent to each other.

In another preferred construction, each of said plurality of other representative packet transfer devices includes reception means for receiving a label request packet addressed to the device of its own, and transmission means for sequentially transmitting, within a partial network to which its own device belongs, the received label request packet to a packet transfer device belonging to the partial network in question.

According to another aspect of the invention, in a packet transfer network for conducting packet transfer between a first terminal and a second terminal through a plurality of packet transfer devices provided between the terminals, a label determination method of determining a label to be used among said plurality of packet transfer devices for the purpose of said packet transfer, comprising the steps of dividing said packet transfer network into a plurality of sections, dividing an original label request packet for use in determining a label to be used among said plurality of packet transfer devices for the purpose of said packet transfer into a plurality of label request packets each for each said section and transmitting the divisional packets, and individually notifying a result of each section which is a response corresponding to said plurality of divisional label request packets.

In the preferred construction, a result of each said section is all a label allocation packet indicative of an affirmative acknowledgment.

In another preferred construction, at least one of results of each said section is a state notification packet indicative of a negative acknowledgment.

According to another aspect of the invention, in a packet transfer network for conducting packet transfer between a first terminal and a second terminal through a plurality of packet transfer devices provided between the terminals, a label determination method of determining a label to be used among said plurality of packet transfer devices for the purpose of said packet transfer, comprising the steps of dividing said packet transfer network into a plurality of partial networks, transmitting an original label request packet for use in determining a label to be used among said plurality of packet transfer devices for the purpose of said packet transfer from a transmission side packet transfer device connected to said first terminal to a reception side packet transfer device connected to said second terminal, receiving said original label request packet at a specific representative packet transfer device in a partial network to which said transmission side packet transfer device belongs, at the specific representative packet transfer device, dividing the original label request packet into a plurality of label request packets each for each said partial network, directly transmitting said plurality of divisional label request packets from said specific representative packet transfer device to a plurality of other representative packet transfer devices in the remainder of the plurality of partial networks in parallel to each other, at each of said plurality of other representative packet transfer devices, receiving a label request packet addressed to the device of its own, sequentially transmitting the received label request packet from each of said representative packet transfer devices to a packet transfer device in a partial network to which the representative packet transfer device in question belongs, at each packet transfer device in each partial network, receiving a label request packet transmitted from a representative packet transfer device of a partial network to which the packet transfer device in question belongs, transmitting a response packet to the received label request packet from each packet transfer device in each partial network to a representative packet transfer device of a partial network to which the packet transfer device in question belongs, at each of said plurality of other representative packet transfer devices, receiving said response packet from a packet transfer device in a partial network to which the representative packet transfer device in question belongs, from each of said plurality of other representative packet transfer devices, directly transmitting said received response packet to said specific representative packet transfer device, at said specific representative packet transfer device, receiving said response packet from each of said plurality of other representative packet transfer devices, at said specific representative packet transfer device, synthesizing said received response packets collected and transmitting the synthesized response packet to said transmission side packet transfer device, at said transmission side packet transfer device, receiving said synthesized response packet, and at said transmission side packet transfer device, returning a result of determination on a label request based on the received synthesized response packet to said first terminal.

In the preferred construction, said response packets are all label allocation packets indicative of an affirmative acknowledgment.

In another preferred construction, at least one of said response packets is a state notification packet indicative of a negative acknowledgment.

According to another aspect of the invention, a packet transfer device for use in a packet transfer network for conducting packet transfer between a first terminal and a second terminal through a plurality of packet transfer devices provided between the terminals, said packet transfer device provided between first and second transmission paths for conducting LDP (Label Distribution Protocol) processing, comprising:

a first LDP multiplexing and separation unit connected to said first transmission path for conducting LDP multiplexing and separation, a second LDP multiplexing and separation unit connected to said second transmission path for conducting LDP multiplexing and separation, a packet switch provided between said first LDP separation unit and said second LDP processing unit, a switch connection table connected to the packet switch for controlling a switch connection state of said packet switch, and an LDP processing unit connected to said first and said second LDP multiplexing and separation units and said switch connection table for processing an LDP packet separated at said first LDP multiplexing and separation unit to multiplex a plurality of LDP packets each for each of a plurality of divisional sections obtained by dividing said packet transfer network and sending the multiplexed packet to said second LDP multiplexing and separation unit, as well as updating said switch connection table.

In the preferred construction, said LDP processing unit includes:

a first adjacent LDP processing unit connected to said first LDP multiplexing and separation unit for interpreting an LDP packet separated at the first LDP multiplexing and separation unit and outputting the received contents, a label determination unit connected to the first adjacent LDP processing unit and said switch connection table for outputting a transmission request according to said received contents from the first adjacent LDP processing unit and an internal state, as well as determining a label value to be used on said first and said second transmission paths to register a combination of the values at said switch connection table, a second adjacent LDP processing unit connected to the label determination unit for generating and outputting an LDP packet according to said transmission request from the label determination unit, at least one remote LDP processing unit connected to said label determination unit for generating and outputting an LDP packet according to said transmission request from the label determination unit, and a packet multiplexing and separation unit connected to said second adjacent LDP processing unit, said at least one remote LDP processing unit and said second LDP multiplexing and separation unit for multiplexing an LDP packet from said second adjacent LDP processing unit and an LDP packet from said at least one remote LDP processing unit and sending the multiplexed packet to said second LDP multiplexing and separation unit.

In another preferred construction, as to an LDP packet from said second LDP multiplexing and separation unit, said packet multiplexing and separation unit allocates LDP packets to said second adjacent LDP processing unit and said at least one remote LDP processing unit according to a label value, said second adjacent LDP processing unit interprets an LDP packet allocated at said packet multiplexing and separation unit and notifies the contents of the received packet to said label determination unit, said at least one remote LDP processing unit interprets an LDP packet allocated at said packet multiplexing and separation unit and notifies the contents of the received packet to said label determination unit, said label determination unit sends a transmission request to said first adjacent LDP processing unit according to the received contents from said second adjacent LDP processing unit and said at least one remote LDP processing unit and an internal state, and said first adjacent LDP processing unit sends an LDP packet to said first LDP multiplexing and separation unit according to a transmission request from said label determination unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a diagram showing one example of a switch connection table for use in the packet transfer device illustrated in FIG. 1;

FIG. 9 is a diagram showing one example of a switch connection table for use in a third packet transfer device used in the packet transfer network illustrated in FIG. 8;

FIG. 10 is a diagram showing one example of a switch connection table for use in a fourth packet transfer device used in the packet transfer network illustrated in FIG. 8;

FIG. 11 is a diagram showing one example of a switch connection table for use in a fifth packet transfer device used in the packet transfer network illustrated in FIG. 8;

FIG. 12 is a diagram showing one example of a switch connection table for use in a first packet transfer device used in the packet transfer network illustrated in FIG. 8;

FIG. 13 is a diagram showing one example of a switch connection table for use in an eighth packet transfer device used in the packet transfer network illustrated in FIG. 8;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
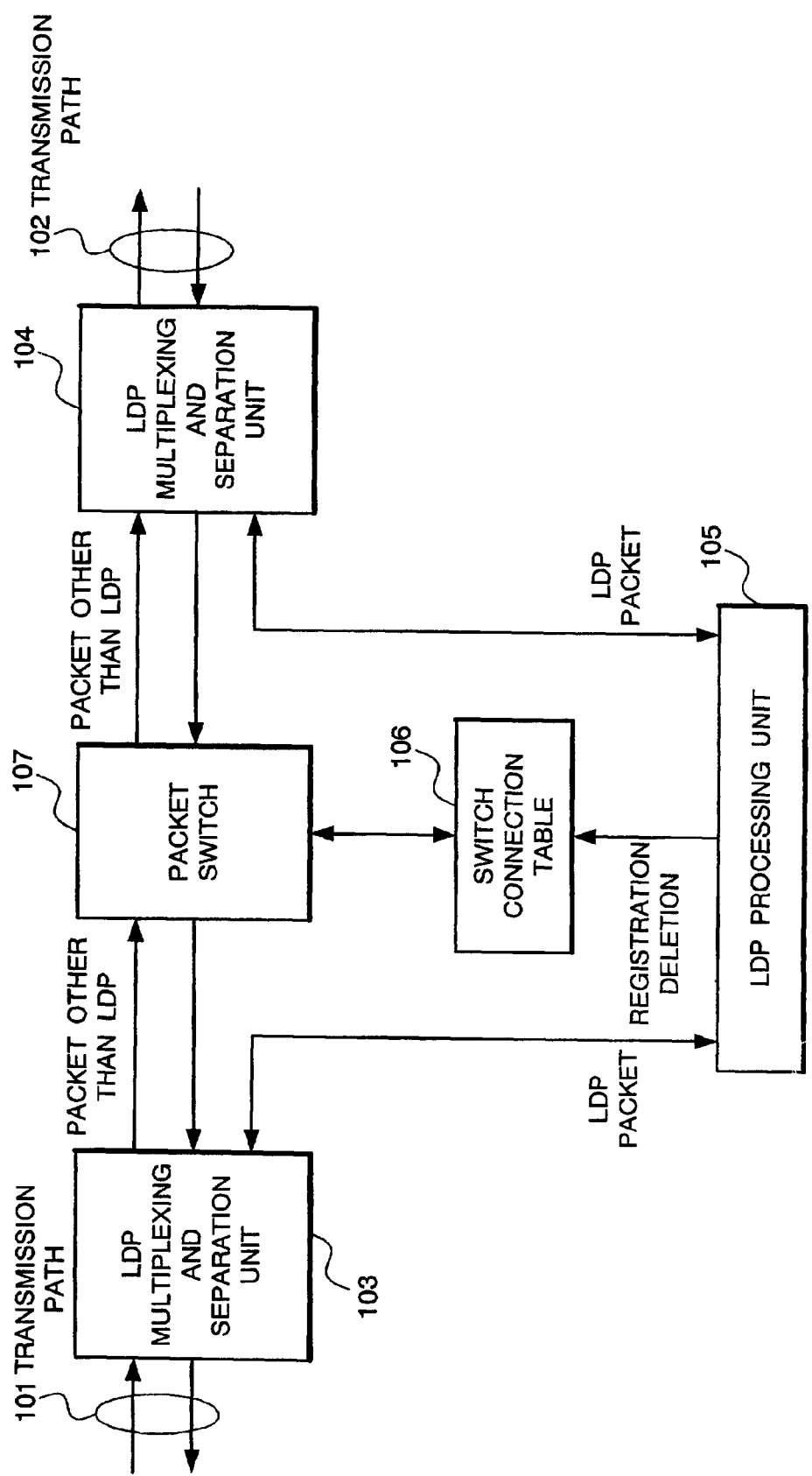
FIG. 1 is a block diagram showing a packet transfer device according to one embodiment of the present invention.

FIG. 1 is a block diagram showing a packet transfer device according to one embodiment of the present invention. The illustrated packet transfer device is provided between a first transmission path 101 and a second transmission path 102. The present example is based on the following assumption. That is, assume that two remotely connected packet transfer devices which transmit and receive LDP packets directly to and from the present packet transfer device exist on the side of the second transmission path 102. Then, the respective packet transfer devices are referred to as a first remote device and a second remote device. LDPs of these first and second remote devices are referred to as a first remote LDP and a second remote LDP, respectively, and to an LDP packet, a predetermined label value is attached.

The packet transfer device of FIG. 1 includes a first LDP multiplexing and separation unit 103 connected to the first transmission path 101, a second LDP multiplexing and separation unit 104 connected to the second transmission path 102, an LDP processing unit 105 connected to the first and second LDP multiplexing and separation units 103 and 104, a switch connection table 106 connected to the LDP processing unit 105, and a packet switch 107 connected between the first and second LDP multiplexing and separation units 103 and 104 and also connected to the switch connection table 107 106.

The first and second LDP multiplexing and separation units 103 and 104 conduct LDP multiplexing and separation as will be described later. The switch connection table 106 controls a switch connection state of the packet switch 107 as will be described later. The LDP processing unit 105 multiplexes a plurality of LDP packets each for each of a plurality of divisional sections of a packet transfer network which packets are obtained by processing an LDP packet separated by the first LDP multiplexing and separation unit 103 and sends the multiplexed packet to the second LDP multiplexing and separation unit 104, as well as updating the switch connection table 106 as will be described later.

In more detail, the first LDP multiplexing and separation unit 103 outputs, of packets from the first transmission path 101, an LDP packet to the LDP processing unit 105 and the other packets to the packet switch 107. At the same time, the first LDP multiplexing and separation unit 103 multiplexes an LDP packet from the LDP processing unit 105 and a packet from the packet switch 107 and outputs the multiplexed packet to the first transmission path 101.

Similarly, the second LDP multiplexing and separation unit 104 outputs, of packets from the second transmission path 102, an LDP packet to the LDP processing unit 105 and the other packets to the packet switch 107. At the same time, the second LDP multiplexing and separation unit 104 multiplexes an LDP packet from the LDP processing unit 105 and a packet from the packet switch 107 and outputs the multiplexed packet to the second transmission path 102.

The LDP processing unit 105 receives and interprets LDP packets from the first LDP multiplexing and separation unit 103 and the second LDP multiplexing and separation unit 104 to newly generate an LDP packet. Then, at the time of outputting the newly generated LDP packet to the first LDP multiplexing and separation unit 103 or the second LDP multiplexing and separation unit 104, the LDP processing unit 105 determines a label based on transmission and reception of these LDP packets and registers the determined label at the switch connection table 106. The switch connection table 106 stores registration information from the LDP processing unit 105.

The packet switch 107 rewrites label information attached to packets from the first LDP multiplexing and separation unit 103 and the second LDP multiplexing and separation unit 104 according to storage contents of the switch connection table 106 and outputs the obtained packets to the first LDP multiplexing and separation unit 103 or the second LDP multiplexing and separation unit 104.

Figure 2:
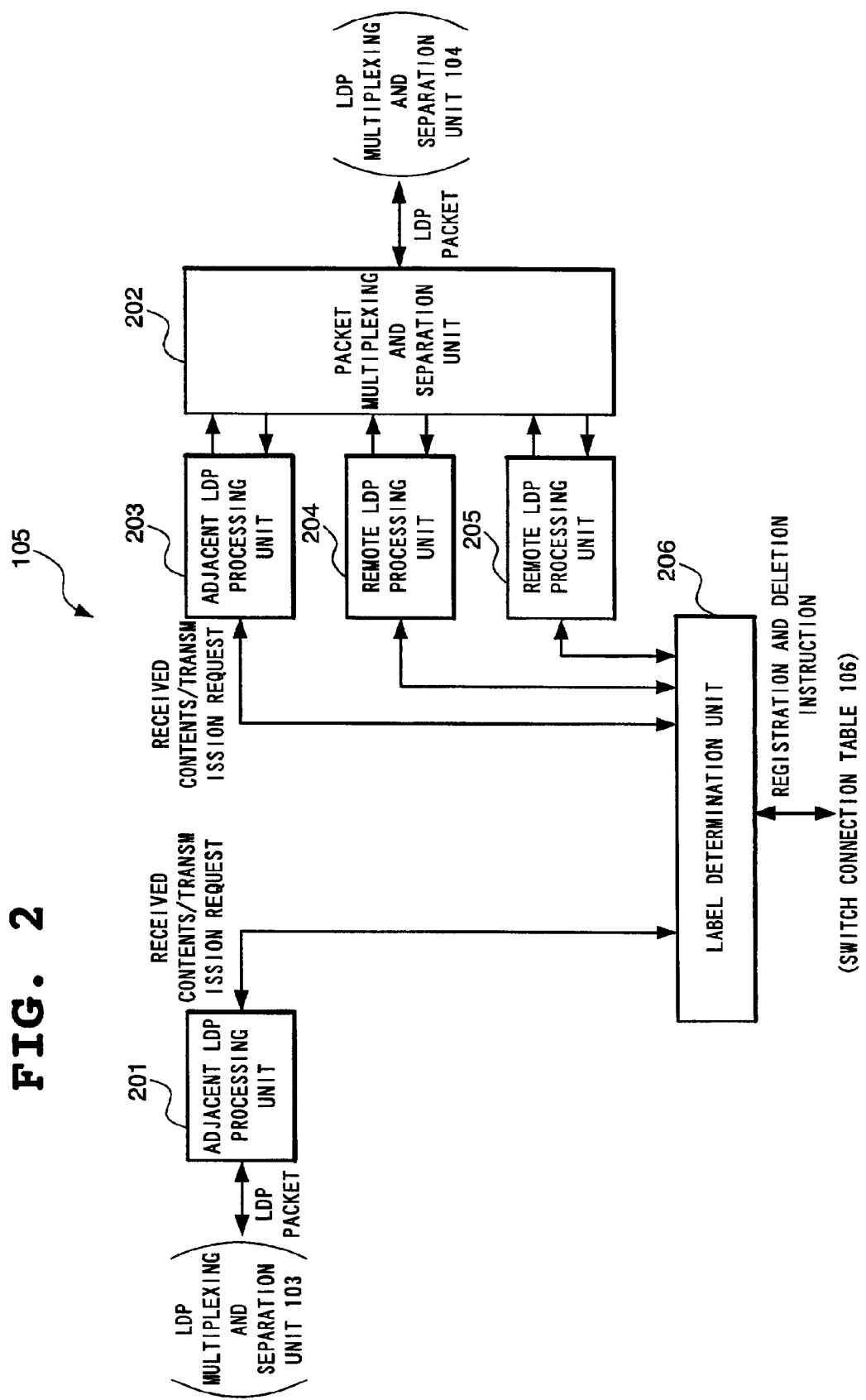
FIG. 2 is a block diagram showing an LDP processing unit for use in the packet transfer device illustrated in FIG. 1.

FIG. 2 is a block diagram showing one embodiment of the LDP processing unit 105 as a crucial part of the present invention. The illustrated LDP processing unit 105 includes a first adjacent LDP processing unit 201 connected to the first LDP multiplexing and separation unit 103, a packet multiplexing and separation unit 202 connected to the second LDP multiplexing and separation unit 104, a second adjacent LDP processing unit 203 connected to the packet multiplexing and separation unit 202, a first remote LDP processing unit 204 connected to the packet multiplexing and separation unit 202, a second remote LDP processing unit 205 connected to the packet multiplexing and separation unit 202, and a label determination unit 206 connected to the first and second adjacent LDP processing units 201 and 203, the first and second remote LDP processing units 204 and 205 and the switch connection table 105 (FIG. 1).

The first adjacent LDP processing unit 201 interprets an LDP packet from the first LDP multiplexing and separation unit 103 and notifies the label determination unit 206 of the received contents, as well as transmitting an LDP packet to the first LDP multiplexing and separation unit 103 in response to a transmission request from the label determination unit 206.

The packet multiplexing and separation unit 202 allocates LDP packets from the second LDP multiplexing and separation unit 104 to the second adjacent LDP processing unit 203, the first remote LDP processing unit 204 or the second remote LDP processing unit 205 according to a label value. At the same time, the packet multiplexing and separation unit 202 multiplexes LDP packets from the second adjacent LDP processing unit 203, the first remote LDP processing unit 204 or the second remote LDP processing unit 205.

The second adjacent LDP processing unit 203 interprets LDP packets allocated by the packet multiplexing and separation circuit 202 and notifies the contents of the received packets to the label determination unit 206. At the same time, the second adjacent LDP processing unit 203 generates an LDP packet in response to a transmission request from the label determination unit 206 and outputs the same to the packet multiplexing and separation unit 202.

The first remote LDP processing unit 204 interprets LDP packets allocated by the packet multiplexing and separation circuit 202 and notifies the contents of the received packets to the label determination unit 206. At the same time, the first remote LDP processing unit 204 generates an LDP packet in response to a transmission request from the label determination unit 206 and outputs the same to the packet multiplexing and separation unit 202.

Similarly, the second remote LDP processing unit 205 interprets LDP packets allocated by the packet multiplexing and separation circuit 202 and notifies the contents of the received packets to the label determination unit 206. At the same time, the second remote LDP processing unit 205 generates an LDP packet in response to a transmission request from the label determination unit 206 and outputs the same to the packet multiplexing and separation unit 202.

When notified of the received contents by any of the first adjacent LDP processing unit 201, the second adjacent LDP processing unit 203, the first remote LDP processing unit 204 and the second remote LDP processing unit 205, the label determination unit 206 sends out a transmission request to any of the first adjacent LDP processing unit 201, the second adjacent LDP processing unit 203, the first remote LDP processing unit 204 and the second remote LDP processing unit 205 according to the contents and an internal state if necessary. At the same time, the label determination unit 206 determines label values for use in the first transmission path 101 and the second transmission path 102 and registers a combination of the labels at the switch connection table 106.

Although only the structure of the LDP processing unit 105 has been described in detail in the foregoing, structures of the first and second LDP multiplexing and separation units 103 and 104, the switch connection table 106 and the packet switch 107 shown in FIG. 1 are well known to those skilled in the art and not directly relevant to the present invention, so that no detailed description thereof will be made here.

Figure 3:
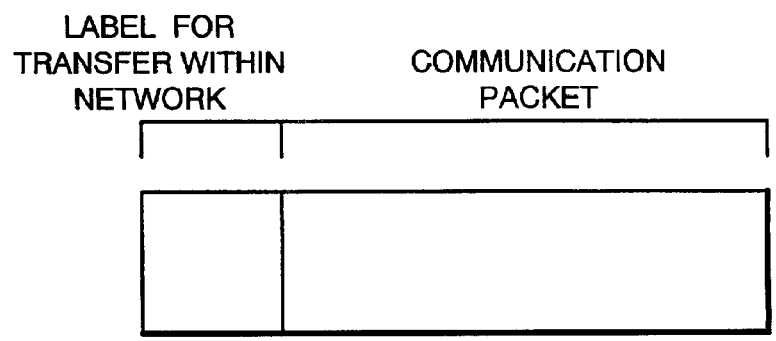
FIG. 3 is a diagram showing a format of a packet to be transmitted and received on a transmission path of the packet transfer device illustrated in FIG. 1.

Next, operation of the packet transfer device of the present invention shown in FIG. 1 will be described. The format of a packet transmitted and received between the first transmission path 101 and the second transmission path 102 is such that a label for transfer within a network is attached to the head of a communication packet sent and received to and from a terminal or a packet transfer device as shown in FIG. 3.

With reference to a label attached to the head of a labeled packet applied through the first transmission path 101, the first LDP multiplexing and separation unit 103 transfers, to the LDP processing unit 105, only a labeled packet having a label value predetermined for LDP packet communication between a packet transfer device directly connected to the first transmission path 101 and the own device and transfers labeled packets having the other label values to the packet switch 107.

With reference to a label attached to the head of a labeled packet applied through the second transmission path 102, the second LDP multiplexing and separation unit 104 transfers only a labeled packet having a label value predetermined for LDP packet communication between a packet transfer device directly connected to the second transmission path 102 and its own device and a labeled packet having a label value predetermined for LDP packet communication between a specific packet transfer device remotely connected and its own device to the LDP processing unit 105 and transfers labeled packets having the remaining label values to the packet switch 107.

The present embodiment is premised on that two remotely connected packet transfer devices which transmit and receive LDP packets directly to and from the present packet transfer device exist on the side of the second transmission path 102. Then, assume that the respective remotely connected packet transfer devices are referred to as first and second remote devices, that LDPs for these remote devices are referred to as a first remote LDP and a second remote LDP and that to the respective LDP packets, a predetermined label value is attached.

The LDP processing unit 105 processes an LDP packet input from the first LDP multiplexing and separation unit 103 or the second LDP multiplexing and separation unit 104 to transmit a connection table registration or deletion instruction to the switch connection table 106. Also, the LDP processing unit 105, as a result of LDP packet processing if necessary, outputs an LDP packet transmission request to the first LDP multiplexing and separation unit 103 if the flow is in the direction of the first transmission path 101 or to the second LDP multiplexing and separation unit 104 if it is in the direction of the second transmission path 102.

Figure 4:
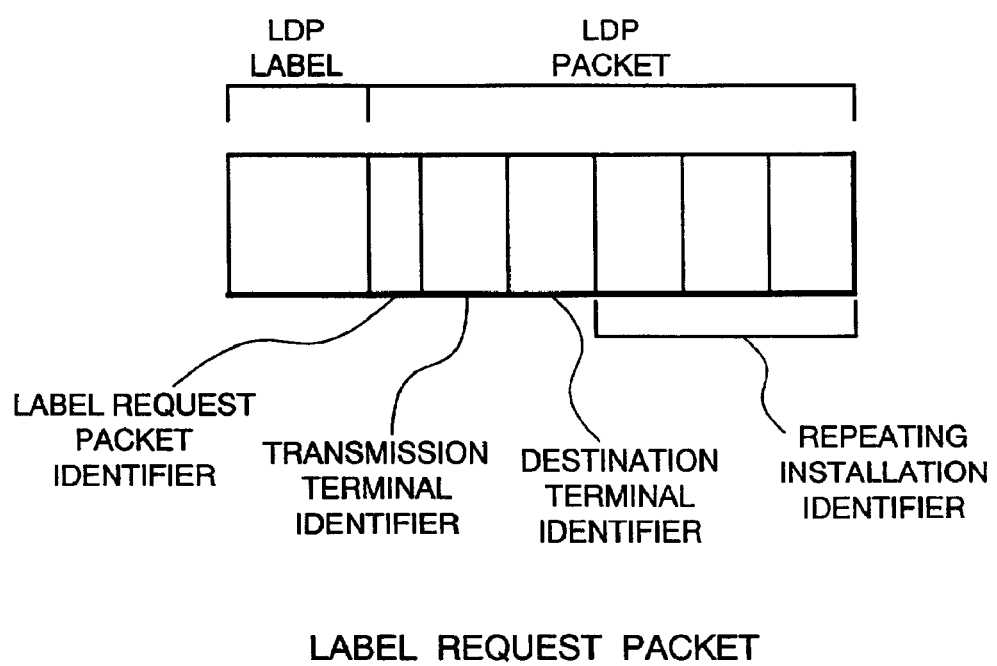
FIG. 4 is a diagram showing a kind and a packet format of an LDP packet to be processed at the LDP processing unit illustrated in FIG. 2, which shows a format of a label request packet.
Figure 5:
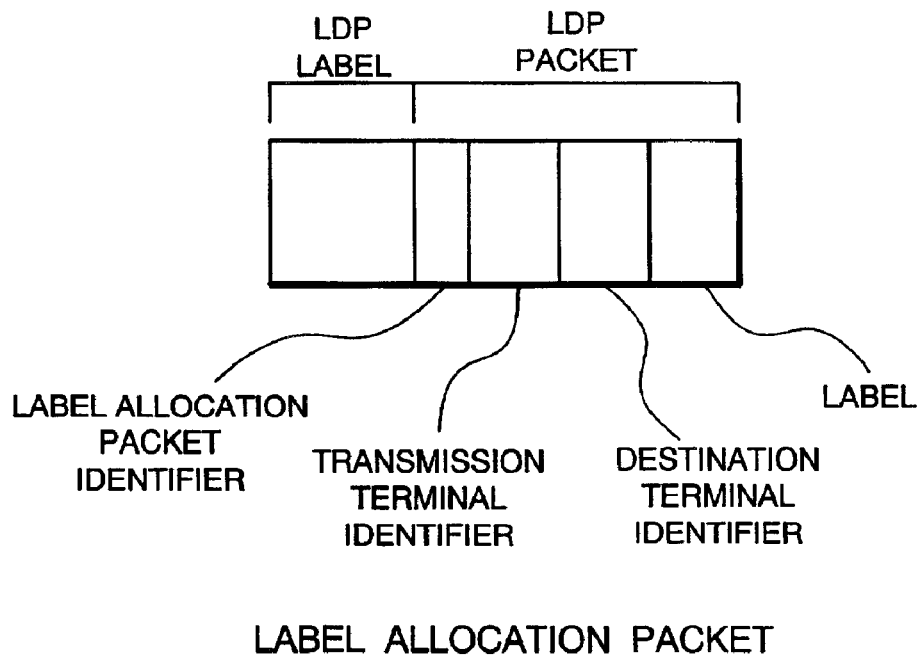
FIG. 5 is a diagram showing a kind and a packet format of an LDP packet to be processed at the LDP processing unit illustrated in FIG. 2, which shows a format of a label allocation packet.
Figure 6:
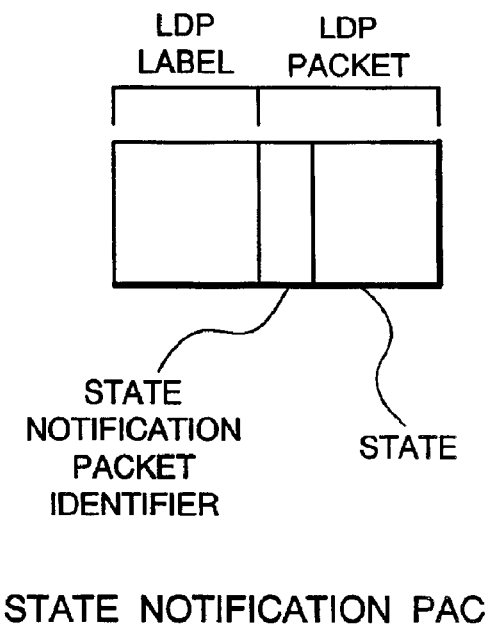
FIG. 6 is a diagram showing a kind and a packet format of an LDP packet to be processed at the LDP processing unit illustrated in FIG. 2, which shows a format of a state notification packet.

In the present example, as an example of a kind and a format of an LDP packet to be processed at the LDP processing unit 105, such three kinds of packet forms as illustrated in FIGS. 4, 5 and 6 are defined. FIG. 4 shows a label request packet, FIG. 5 shows a label allocation packet and FIG. 6 shows a state notification packet.

As illustrated in FIG. 4, the label request packet is formed by attaching an LDP label to the head of an LDP packet which includes a label request packet identifier, a transmission terminal identifier, a destination terminal identifier and a plurality of repeating installation identifiers. As illustrated in FIG. 5, the label allocation packet is formed by attaching an LDP label to the head of an LDP packet which includes a label allocation packet identifier, a transmission terminal identifier, a destination terminal identifier and a label. As illustrated in FIG. 6, the state notification packet is formed by attaching an LDP label to the head of an LDP packet which includes a state notification packet identifier and a state.

The switch connection table 106 rewrites an internal table according to a connection table registration or deletion instruction from the LDP processing unit 105. Here, "connection table" is a set of such groups each having an input transmission path identifier, an input transmission path label value, an output transmission identifier and an output transmission path label value as one group as shown in FIG. 7.

The packet switch 107 receives a packet from the first LDP multiplexing and separation unit 103 or the second LDP multiplexing and separation unit 104 to search for a packet having a combination of a transmission path through which the packet is received and a label attached to the received packet which coincides with input side information of the switch connection table 106. When there exists a coincident packet, the packet switch 107 replaces the label attached to the received packet with an output side label stored in the coincident entry and then outputs the obtained packet to an output side transmission path stored in the coincident entry.

The first LDP multiplexing and separation unit 103 multiplexes a packet output from the packet switch 107 and a packet from the LDP packet processing unit 105 and outputs the multiplexed packet to the first transmission path 101. Similarly, the second LDP multiplexing and separation unit 104 multiplexes a packet output from the packet switch 107 and a packet from the LDP packet processing unit 105 and outputs the multiplexed packet to the second transmission path 102.

Next, description will be made of operation of the LDP processing unit 105 according to the present invention shown in FIG. 2. The first adjacent LDP processing unit 201 transmits each information element of a received packet to the label determination unit 206. Here, "information element" includes a kind of received packet (any of a label request packet, a label allocation packet and a state notification packet) and information each received packet has. Information each received packet has includes, when the received packet is a label request packet, for example, a transmission terminal identifier, a reception terminal identifier and a repeating installation identifier.

When the first adjacent LDP processing unit 201 receives a label request packet as a received packet, the label determination unit 206 first checks whether a label value yet to be used exists on the side of the first transmission path 101 and the second transmission path 102. When a label yet to be used fails to exist on either of the sides of the transmission paths, the label determination unit 206 outputs, to the first adjacent LDP processing unit 201, a request for transmitting a state notification packet whose state has a code indicating that no label yet to be used exists. When a label value yet to be used exists on both sides, the label determination unit 206 next checks whether an identifier of the first remote device or the second remote device exists in the repeating installation identifier. Operation in each of these cases will be described in the following.

Assume that none of device identifiers exists in the repeating installation identifier. In this case, the label determination unit 206 outputs, to the second adjacent LDP processing unit 203, a request for transmitting a label request packet whose transmission terminal identifier and destination terminal identifier are both the same as those of the label request packet received by the first adjacent LDP processing unit 201, which has an information element obtained by excluding its own device identifier from repeating installation identifiers and to which a label value assigned in advance for LDP transfer with an adjacent device is attached. Then, the label determination unit 206 waits for the second adjacent LDP processing unit 203 to receive a label allocation packet or a state notification packet as a response to a label request packet whose transmission is requested. The second adjacent LDP processing unit 203 outputs a label request packet in response to a transmission request from the label determination unit 206. The packet multiplexing and separation unit 202 and the second LDP multiplexing and separation unit 104 (FIG. 1) multiplex the label request packet in question and other packets and output the multiplexed packet to the second transmission path 102.

After a label allocation packet or a state notification packet as a response to the label request packet transmitted to the second transmission path 102 is separated by the second LDP multiplexing and separation unit 104 and the packet multiplexing and separation unit 202, the second adjacent LDP processing unit 203 outputs the contents of the received packet (label allocation packet or state notification packet) to the label determination unit 206.

When the received packet is a label allocation packet, the label determination unit 206 selects a label yet to be used on the side of the first transmission path 101 and requests the switch connection table 106 to register a combination of the selected value and an allocated label contained in the received label allocation packet. At the same time, the label determination unit 206 outputs, to the first adjacent LDP processing unit 201, a request for transmitting a label allocation packet whose transmission terminal identifier and destination terminal identifier are the same as those of the received label request packet, whose allocated label has the selected label yet to be used on the side of first transmission path 101 as an information element and to which a label assigned in advance for LDP transfer with an adjacent device is attached.

When the received packet is a state notification packet, the label determination unit 206 outputs, to the first adjacent LDP processing unit 201, a request for transmitting a state notification packet which has the same information element as that of the received state notification packet and to which a label assigned in advance for LDP transfer with an adjacent device is attached.

The first adjacent LDP processing unit 201, in either case, outputs an LDP packet in response to the transmission request from the label determination unit 206 and the first LDP multiplexing and separation unit 103 multiplexes the LDP packet with other packet and outputs the multiplexed packet to the first transmission path 101.

Assume that only the device identifier indicative of the first remote device exists as the repeating installation identifier. In this case, the label determination unit 206 outputs, to the second adjacent LDP processing unit 203, a request for transmitting a label request packet whose transmission terminal identifier is its own device identifier, destination terminal identifier is the device identifier of the first remote device and repeating installation identifier has, as an information element, a device identifier located before the device identifier of the first remote device among repeating installation identifiers of the received label request packet and to which a label assigned in advance for LDP transfer with an adjacent device is attached. At the same time, the label determination unit 206 outputs, to the first remote LDP processing unit 204, a request for transmitting a label request packet whose transmission terminal identifier is the device identifier of the remote device 1, destination terminal identifier is the destination terminal identifier of the received label request packet and repeating installation identifier has an information element of a device identifier located after the first remote device among repeating installation identifiers of the received request message and to which a label assigned in advance for LDP transfer with the first remote device is attached. Then, the label determination unit 206 waits for the second adjacent LDP processing unit 203 and the first remote LDP processing unit 204 to receive a label allocation packet or a state notification packet as a response to the label request packet whose transmission is requested.

The second adjacent LDP processing unit 203 and the first remote LDP processing unit 204 output a label request packet in response to the transmission request from the label determination unit 206, and the packet multiplexing and separation unit 202 and the second LDP multiplexing and separation unit 104 (FIG. 1) multiplex the label request packet in question and other packet and output the multiplexed packet to the second transmission path 102.

After a label allocation packet or a state notification packet as a response to the label request packet transmitted to the second transmission path 102 is separated by the second LDP multiplexing and separation unit 104 and the packet multiplexing and separation unit 202, the second adjacent LDP processing unit 203 and the first remote LDP processing unit 204 respectively receive the separated packets and output the contents of the received packets to the label determination unit 206.

Assume that the packets received by the second adjacent LDP processing unit 203 and the first remote LDP processing unit 204 are both label allocation packets. In this case, the label determination unit 206 selects a label yet to be used on the side of the first transmission path 101 and requests the switch connection table 106 to register a combination of the selected label value and a label value contained in the label allocation packet received by the second adjacent LDP processing unit 203. At the same time, the label determination unit 206 outputs, to the first adjacent LDP processing unit 201, a request for transmitting a label allocation packet whose transmission terminal identifier and destination terminal identifier are both the same as those of the received label request packet, whose allocated label has the selected label yet to be used on the side of first transmission path 101 as an information element and to which a label assigned in advance for LDP transfer with an adjacent device is attached.

Also assume that either the second adjacent LDP processing unit 203 or the first remote LDP processing unit 204 receives a state notification packet. In this case, the label determination unit 206 outputs, to the first adjacent LDP processing unit 201, a request for transmitting a state notification packet having the same information element as that of the received state notification packet and having a label assigned in advance for LDP transfer with an adjacent device attached thereto.

The first adjacent LDP processing unit 201, in either case, outputs an LDP packet in response to the transmission request from the label determination unit 206, and the first LDP multiplexing and separation unit 103 (FIG. 1) multiplexes the LDP packet with other packet and outputs the multiplexed packet to the first transmission path 101.

Assume that only the device identifier indicative of the second remote device exists as the repeating installation identifier. In this case, the label determination unit 206 outputs, to the second adjacent LDP processing unit 203, a request for transmitting a label request packet whose transmission terminal identifier is its own device identifier, destination terminal identifier is the device identifier of the second remote device and repeating installation identifier has, as an information element, a device identifier located before the device identifier of the second remote device among the repeating installation identifiers of the received label request packet and to which a label value assigned in advance for LDP transfer with an adjacent device is attached. At the same time, the label determination unit 206 outputs, to the second remote LDP processing unit 205, a request for transmitting a label request packet whose transmission terminal identifier is the device identifier of the second remote device, destination terminal identifier is the destination terminal identifier of the received label request packet and repeating installation identifier has, as an information element, a device identifier located after the second remote device identifier among repeating installation identifiers of the received request message and to which a label assigned for LDP transfer with the second remote device is attached. Then, the label determination unit 206 waits for the second adjacent LDP processing unit 203 and the second remote LDP processing unit 205 to receive a label allocation packet or a state notification packet as a response to the label request packet whose transmission is requested.

The second adjacent LDP processing unit 203 and the second remote LDP processing unit 205 respectively output a label request packet in response to the transmission request from the label determination unit 206, and the packet multiplexing and separation unit 202 and the second LDP multiplexing and separation unit 104 multiplex the label request packet in question and other packet and output the multiplexed packet to the second transmission path 102.

After a label allocation packet or a state notification packet as a response to the label request packet transmitted to the second transmission path 102 is separated by the second LDP multiplexing and separation unit 104 and the packet multiplexing and separation unit 202, the second adjacent LDP processing unit 203 and the second remote LDP processing unit 205 respectively receive the separated packets and output the contents of the received packets to the label determination unit 206.

Assume that the packets received by the second adjacent LDP processing unit 203 and the second remote LDP processing unit 205 are both label allocation packets. In this case, the label determination unit 206 selects a label yet to be used on the side of the first transmission path 101 and requests the switch connection table 106 to register a combination of the selected label value and a label value contained in the label allocation packet received by the second adjacent LDP processing unit 203. At the same time, the label determination unit 206 outputs, to the first adjacent LDP processing unit 201, a request for transmitting a label allocation packet whose transmission terminal identifier and destination terminal identifier are both the same as those of the received label request packet, whose allocated label has the selected label yet to be used on the side of first transmission path 101 as an information element and to which a label assigned in advance for LDP transfer with an adjacent device is attached.

Also assume that either the second adjacent LDP processing unit 203 or the second remote LDP processing unit 205 receives a state notification packet. In this case, the label determination unit 206 outputs, to the first adjacent LDP processing unit 201, a request for transmitting a state notification packet having the same information element as that of the received state notification packet and having a label assigned in advance for LDP transfer with an adjacent device attached thereto.

The first adjacent LDP processing unit 201, in either case, outputs an LDP packet in response to the transmission request from the label determination unit 206, and the first LDP multiplexing and separation unit 103 (FIG. 1) multiplexes the LDP packet with other packet and outputs the multiplexed packet to the first transmission path 101.

Further assume that both of the device identifiers indicative of the first remote device and the second remote device exist as the repeating installation identifier.

In this case, the label determination unit 206 outputs, to the second adjacent LDP processing unit 203, a request for transmitting a label request packet whose transmission terminal identifier is its own device identifier, destination terminal identifier is the device identifier of the first remote device and repeating installation identifier has, as an information element, a device identifier located before the first remote device among repeating installation identifiers of the received label request packet and to which a label assigned in advance for LDP transfer with an adjacent device is attached.

The label determination unit 206 also outputs, to the first remote LDP processing unit 204, a request for transmitting a label request packet whose transmission terminal identifier is the device identifier of the first remote device, destination terminal identifier is the identifier of the second remote device and repeating installation identifier has, as an information element, a device identifier located between the identifier of the first remote device and the identifier of the second remote device among the repeating installation identifiers of the received label request packet and to which a label assigned in advance for LDP communication with the first remote device is attached.

Furthermore, the label determination unit 206 outputs, to the second remote LDP processing unit 205, a request for transmitting a label request packet whose transmission terminal identifier is the device identifier of the second remote device, destination terminal identifier is the destination terminal identifier of the received label request packet and repeating installation identifier has, as an information element, a device identifier located after the identifier of the second remote device among the repeating installation identifiers of the received label request packet and to which a label assigned in advance for LDP communication with the second remote device is attached.

Then, the label determination unit 206 waits for the second adjacent LDP processing unit 203, the first remote LDP processing unit 204 and the second remote LDP processing unit 205 to receive a label allocation packet or a state notification packet as a response to the label request packet whose transmission is requested.

The second adjacent LDP processing unit 203, the first remote LDP processing unit 204 and the second remote LDP processing unit 205 respectively output a label request packet in response to the transmission request from the label determination unit 206, and the packet multiplexing and separation unit 202 and the second LDP multiplexing and separation unit 104 (FIG. 1) multiplex the label request packet in question and other packet and output the multiplexed packet to the second transmission path 102.

After a label allocation packet or a state notification packet as a response to the label request packet transmitted to the second transmission path 102 is separated by the second LDP multiplexing and separation unit 104 and the packet multiplexing and separation unit 202, the second adjacent LDP processing unit 203, the first remote LDP processing unit 204 and the second remote LDP processing unit 205 output the contents of the received packets to the label determination unit 206.

Assume that the packets received by the second adjacent LDP processing unit 203, the first remote LDP processing unit 204 and the second remote LDP processing unit 205 are all label allocation packets. In this case, the label determination unit 206 selects a label yet to be used on the side of the first transmission path 101 and requests the switch connection table 106 to register a combination of the selected value and a label contained in the label allocation packet received by the second adjacent LDP processing unit 203. At the same time, the label determination unit 206 outputs, to the first adjacent LDP processing unit 201, a request for transmitting a label allocation packet whose transmission terminal identifier and destination terminal identifier are both the same as those of the received label request packet, whose allocated label has the selected label yet to be used on the side of first transmission path 101 as an information element and to which a label assigned in advance for LDP transfer with an adjacent device is attached.

Also assume that any one of the second adjacent LDP processing unit 203, the first remote LDP processing unit 204 and the second remote LDP processing unit 205 receives a state notification packet as a received packet. In this case, the label determination unit 206 outputs, to the first adjacent LDP processing unit 201, a request for transmitting a state notification packet having the same information element as that of the received state notification packet and having a label assigned in advance for LDP transfer with an adjacent device attached thereto.

The first adjacent LDP processing unit 201, in any case, outputs an LDP packet in response to the transmission request from the label determination unit 206, and the first LDP multiplexing and separation unit 103 multiplexes the LDP packet in question with other packet and outputs the multiplexed packet to the first transmission path 101.

Upon receiving a label request packet, the first remote LDP processing unit 204 transmits each information element of the packet to the label determination unit 206. The label determination unit 206, upon receiving a label request packet whose transmission terminal identifier is its own device identifier, checks whether a label yet to be used exists on the side of the first transmission path 101 and the side of the second transmission path 102. When the relevant labels exist on both sides, the label determination unit 206 outputs a request for transmitting a label request packet having the same information elements as those of the received label request packet to the first adjacent LDP processing unit 201 and waits for the first adjacent LDP processing unit 201 to receive a label allocation packet or a state notification packet and for the second adjacent LDP processing unit 203 to receive a label request packet whose destination terminal identifier is its own device identifier. The first adjacent LDP processing unit 201 outputs a label request packet in response to the transmission request from the label determination unit 206 and the first LDP multiplexing and separation unit 103 multiplexes the label request packet in question and other packet and outputs the multiplexed packet to the first transmission path 101.

After a label allocation packet or a state notification packet as a response to the label request packet transmitted to the first transmission path 101 is separated by the first LDP multiplexing and separation unit 103, the first adjacent LDP processing unit 201 receives the separated packets and outputs the contents of the received packets to the label determination unit 206.

Assume that the packet received by the first adjacent LDP processing unit 201 is a label allocation packet and the second adjacent LDP processing unit 203 receives a label request packet whose destination terminal identifier is its own device identifier. In this case, the label determination unit 206 selects a label yet to be used on the side of the second transmission path 102 and requests the switch connection table 106 to register a combination of the selected value and an allocated label value contained in the label allocation packet received by the first adjacent LDP processing unit 201. At the same time, the label determination unit 206 outputs, to the first remote LDP processing unit 204, a request for transmitting a label allocation packet whose transmission terminal identifier and destination terminal identifier are both the same as those of the received label request packet, whose allocated label has the selected label yet to be used on the side of the first transmission path 101 as an information element and to which a label assigned in advance for LDP transfer with the first remote device is attached.

Also assume that the packet received by the first adjacent LDP processing unit 201 is a state notification packet. In this case, the label determination unit 206 outputs, to the first remote LDP processing unit 204, a request for transmitting a state notification packet having the same information elements as those of the received state notification packet and having a label assigned in advance for LDP transfer with an adjacent device attached.

The first remote LDP processing unit 204, in either case, outputs an LDP packet in response to the transmission request from the label determination unit 206 and the packet multiplexing and separation unit 202 and the first LDP multiplexing and separation unit 104 (FIG. 1) multiplex the LDP packet with other packet and output the multiplexed packet to the second transmission path 102.

Upon receiving a label request packet, the second remote LDP processing unit 205 transmits each information element of the packet to the label determination unit 206. The label determination unit 206, upon receiving a label request packet whose transmission terminal identifier is its own device identifier, checks whether a label yet to be used exists on the side of the first transmission path 101 and the side of the second transmission path 102. When the relevant labels exist on both sides, the label determination unit 206 outputs a request for transmitting a label request packet having the same information elements as those of the received label request packet to the first adjacent LDP processing unit 201 and waits for the first adjacent LDP processing unit 201 to receive a label allocation packet or a state notification packet and for the second adjacent LDP processing unit 203 to receive a label request packet whose destination terminal identifier is its own device identifier. The first adjacent LDP processing unit 201 outputs a label request packet in response to the transmission request from the label determination unit 206, and the first LDP multiplexing and separation unit 103 (FIG. 1) multiplexes the label request packet in question and other packet and outputs the multiplexed packet to the first transmission path 101.

After a label allocation packet or a state notification packet as a response to the label request packet transmitted to the first transmission path 101 is separated by the first LDP multiplexing and separation unit 103, the first adjacent LDP processing unit 201 receives the separated packets and outputs the contents of the received packets to the label determination unit 206.

Assume that the packet received by the first adjacent LDP processing unit 201 is a label allocation packet and the second adjacent LDP processing unit 203 receives a label request packet having its own device identifier as a destination terminal identifier. In this case, the label determination unit 206 selects a label value yet to be used on the side of the second transmission path 102 and requests the switch connection table 106 to register a combination of the selected value and a label value contained in the label allocation packet received by the first adjacent LDP processing unit 201. Then, the label determination unit 206 outputs, to the second remote LDP processing unit 205, a request for transmitting a label allocation packet whose transmission terminal identifier and destination terminal identifier are both the same as those of the received label request packet and whose allocated label has the selected label yet to be used on the side of first transmission path 101 as an information element.

Also assume that the packet received by the first adjacent LDP processing unit 201 is a state notification packet. In this case, the label determination unit 206 outputs, to the first remote LDP processing unit 204, a request for transmitting a state notification packet having the same information elements as those of the received state notification packet.

The first remote LDP processing unit 204, in either case, outputs an LDP packet in response to the transmission request from the label determination unit 206, and the packet multiplexing and separation unit 202 and the second LDP multiplexing and separation unit 104 multiplex the LDP packet with other packet and output the multiplexed packet to the second transmission path 102.

Next, with reference to FIG. 8, description will be made of operation of a packet transfer network constituted by the packet transfer devices according to the present invention shown in FIGS. 1 and 2. The illustrated packet transfer network has first and second terminals 611 and 612, between which first to eighth packet transfer devices 601, 602, 603, 604, 605, 606, 607 and 608 exist. In the present example, one packet transfer network is divided into four portions or sections (first partial network A, second partial network B, third partial network C and fourth partial network D) and between their boundaries, the second, fourth and seventh packet transfer devices 602, 604 and 607 exist as shown by a rectangle made by dotted lines in FIG. 8. Assume also that the first terminal 611 is a transmission terminal and the second terminal 612 is a reception terminal.

Although in general, a path through which communication packets between terminals pass is statistically given by a network operator or dynamically determined when a packet arrives, description will be here made assuming that at the time when the transmission terminal 611 transmits a communication packet to the reception terminal 612, paths on which a labeled packet is to be transferred are the second, fourth and seventh packet transfer devices 602, 604 and 607. In the following description, there is a case where a packet transfer device is simply referred to as a device.

Here, each partial network has at least one packet transfer device as a representative arranged at a starting point of a path. In the present example, the representative packet transfer device is arranged at boundaries between partial networks (sections) adjacent to each other. In more detail, as a packet transfer device representing the first partial network A, the second packet transfer device 602 is provided. As a packet transfer device representing the second partial network B, the second and fourth packet transfer devices 602 and 604 are provided. The third partial network C has the fourth and seventh packet transfer devices 604 and 607 as representative packet transfer devices. The fourth partial network D has the seventh packet transfer device 607 as a representative packet transfer device.

In addition, the first packet transfer device 601 directly connected to the first terminal 611 as a transmission terminal is referred to as a transmission side packet transfer device and the eighth packet transfer device 608 directly connected to the second terminal 612 as a destination terminal is referred to as a reception side packet transfer device. The transmission side packet transfer device 601 belongs to the first partial network A, while the reception side packet transfer device 608 belongs to the fourth partial network D. As will be described later, for packet transfer between the first terminal 611 and the second terminal 612, the transmission side packet transfer device 601 transmits an original label request packet for use in determining labels to be used among the packet transfer devices 601, 602, 603, 604, 605, 607 and 608 to the reception side packet transfer device 608.

In the present invention, the original label request packet is first sent to the second packet transfer device 602 as a specific representative packet transfer device in the first partial network A to which the transmission side packet transfer device 601 belongs. The specific representative packet transfer device 602 divides the received original label request packet into a plurality of label request packets each for each partial network (section) and transmits the divisional packets. In the present embodiment, the specific representative packet transfer device 602 will transmit first to third divisional label request packets individually to the second partial network B, the third partial network C and the fourth partial network D. More specifically, the first divisional label request packet is directly transmitted to the representative packet transfer device in the second partial network B, the second divisional label request packet is directly transmitted to the representative packet transfer device in the third partial network C and the third divisional label request packet is directly transmitted to the representative packet transfer device in the fourth partial network D.

It should be noted here that the second packet transfer device 602 is not only a packet transfer device representing the first partial network A but also a packet transfer device representing the second partial network B. In the present embodiment, therefore, the specific representative packet transfer device 602 does not need to transmit the first divisional label request packet to the representative packet transfer device in the second partial network B. The specific representative packet transfer device 602 directly transmits the second divisional label request packet to the fourth packet transfer device 604 which is a representative packet transfer device in the third partial network C and directly transfers the third divisional label request packet to the seventh packet transfer device 507 which is a packet transfer device representing the fourth partial network D.

Each representative packet transfer device, upon receiving a divisional label request packet directed to its own device, sequentially transmits the received label request packet to a packet transfer device within a partial network (section) to which its own device belongs. More specifically, in the case of the present embodiment, the second packet transfer device 602 which is a representative packet transfer device in the second partial network B sequentially transmits the first divisional label request packet to the third and fourth packet transfer devices 603 and 604 belonging to the second partial network B. Similarly, the fourth packet transfer device 604 which is a representative packet transfer device in the third partial network C sequentially transmits the received second divisional label request packet to the fifth and seventh packet transfer devices 605 and 607 belonging to the third partial network C. The seventh packet transfer device 607 which is a representative packet transfer device in the fourth partial network D transmits the received third divisional label request packet to the eighth packet transfer device (reception side packet transfer device) 608 belonging to the fourth partial network D.

A packet transfer device will be referred to also as a node. In summary, the system of the present invention is such that with one representative node in a plurality of partial networks (groups) as a starting point, label request packets are transmitted simultaneously from the representative node as the starting node to a representative node of each group and in each group, the representative node transmits the received label request packet to each node in the group. In other words, while a conventional system is a sequential processing system, the present invention employs a parallel processing system. Since the present invention thus employs a parallel processing system, it is possible to reduce accumulation of time of delay for propagation in a label request packet to be transmitted from a transmission side packet transfer device to a reception side packet transfer device.

Also in the present invention, when a response packet to a label request packet is received at a representative packet transfer device in each partial network, each representative packet transfer device directly transmits the received response packet to a specific representative packet transfer device. The specific representative packet transfer device transmits a result of the collected response packets to a transmission side packet transfer device, so that based on a result of the collected response packets, the transmission side packet transfer device determines whether a label request is allowed or not.

In the case of the present embodiment, a first response packet to the first divisional label request packet is received at the second packet transfer device (specific representative packet transfer device) 602 from the fourth packet transfer device 604 belonging to the second partial network B through the third packet transfer device 603. A second response packet to the second divisional label request packet is received at the fourth packet transfer device (representative packet transfer device) 604 from the seventh packet transfer device 607 belonging to the third partial network C through the fifth packet transfer device 605, and then directly transmitted from the fourth packet transfer device 604 to the second packet transfer device 602.

Similarly, a third response packet to the third divisional label request packet is received at the seventh packet transfer device (representative packet transfer device) 607 from the eighth packet transfer device (reception side packet transfer device) 608 belonging to the fourth partial network D and then directly transmitted to the second packet transfer device 602 from the seventh packet transfer device 607. The second packet transfer device (specific representative packet transfer device) 602 synthesizes these collected first to third response packets and returns the synthesized acknowledgement packet to the first packet transfer device (transmission side packet transfer device) 601.

In summary, in the system of the present invention, within each group, after its representative node once receives a response packet to a label request packet from each node in the group, the packet is transmitted from the representative node of the group to a representative node as a starting point. In other words, the present invention employs a parallel processing system also when returning a response packet. Thus employing a parallel processing system, the present invention enables reduction in a label determination time for packet transfer, thereby reducing a time for waiting for packet communication to start.

Although in general, arrangement of the remote LDP processing unit shown in FIG. 2 is an arbitrary, the arrangement is here assumed to be as follows. More specifically, in the second packet transfer device 602, there exists a remote LDP processing unit for the fourth packet transfer 604 and the seventh packet transfer device 607. In the fourth packet transfer device 604, there exists a remote LDP processing unit for the second packet transfer, device 602. Furthermore, in the seventh packet transfer device 607, there exists a remote LDP processing unit for the second packet transfer device 602. Then, for a label value for LDP packet transfer between the second packet transfer device 602 and the fourth packet transfer device 604, 0x01 is reserved, for a label value for LDP packet transfer between the second packet transfer device 602 and the seventh packet transfer device 607, 0x02 is reserved and for a label value for LDP packet transfer between adjacent devices, 0x00 is reserved.

Here, first two characters of a label value "0x" represent a hexadecimal number. Also assume that the length of a label value is 20 bits. Accordingly, 0x00, for example, represents 00000H in practice.

At this time, in the switch connection table 106 of the third, fourth and fifth packet transfer devices 603, 604 and 605, such switch connection tables 106 as shown in FIGS. 9, 10 and 11 are stored respectively.

As shown in FIG. 9, the third packet transfer device 603 includes a switch connection table having four entries, entry 1, entry 2, entry 3 and entry 4. The entry 1 has an input transmission path identifier on the second packet transfer device 602 side, an input transmission path label value of 0x01, an output transmission path identifier on the fourth packet transfer device 604 side and an output transmission path label value of 0x01. The entry 2 has an input transmission path identifier on the fourth packet transfer device 604 side, an input transmission path label value of 0x01, an output transmission path identifier on the second packet transfer device 602 side and an output transmission path label value of 0x01. The entry 3 has an input transmission path identifier on the second packet transfer device 602 side, an input transmission path label value of 0x02, an output transmission path identifier on the fourth packet transfer device 604 side and an output transmission path label value of 0x02. The entry 4 has an input transmission path identifier on the fourth packet transfer device 604 side, an input transmission path label value of 0x02, an output transmission path identifier on the second packet transfer device 602 side and an output transmission path label value of 0x02.

As shown in FIG. 10, the fourth packet transfer device 604 includes a switch connection table having two entries, entry 1 and entry 2. The entry 1 has an input transmission path identifier on the third packet transfer device 603 side, an input transmission path label value of 0x02, an output transmission path identifier on the fifth packet transfer device 605 side and an output transmission path label value of 0x02. The entry 2 has an input transmission path identifier on the fifth packet transfer device 605 side, an input transmission path label value of 0x02, an output transmission path identifier on the third packet transfer device 603 side and an output transmission path label value of 0x02.

As shown in FIG. 11, the fifth packet transfer device 605 includes a switch connection table having two entries, entry 1 and entry 2. The entry 1 has an input transmission path identifier on the fourth packet transfer device 604 side, an input transmission path label value of 0x02, an output transmission path identifier on the seventh packet transfer device 607 side and an output transmission path label value of 0x02. The entry 2 has an input transmission path identifier on the seventh packet transfer device 607 side, an input transmission path label value of 0x02, an output transmission path identifier on the fourth packet transfer device 604 side and an output transmission path label value of 0x02.

Assume that respectively in the switch connection tables 106 of the first and eighth packet transfer devices 601 and 608, such switch connection tables 106 as shown in FIGS. 12 and 13 are stored.

As shown in FIG. 12, the first packet transfer device 601 is provided with a switch connection table including an entry 1. Stored in the entry 1 are the second terminal 612 as a destination terminal, the first terminal 611 as a transmission terminal and 0x00 as a label value on the second packet transfer device 602 side.

As shown in FIG. 13, the eighth packet transfer device 608 is provided with a switch connection table having an entry 1. Stored in the entry 1 are the second terminal 612 as a destination terminal, the first terminal 611 as a transmission terminal and 0x03 as a label value on the seventh packet transfer device 607 side.

In the following, description will be made of operation of each packet transfer device in the packet transfer network shown in FIG. 8 on the premise described in the foregoing. For the simplicity of explanation, a label request packet will be denoted as [transmission terminal identifier, destination terminal identifier, identifier of repeating installation 1/identifier of repeating installation 2/ . . . ].

Figure 8:
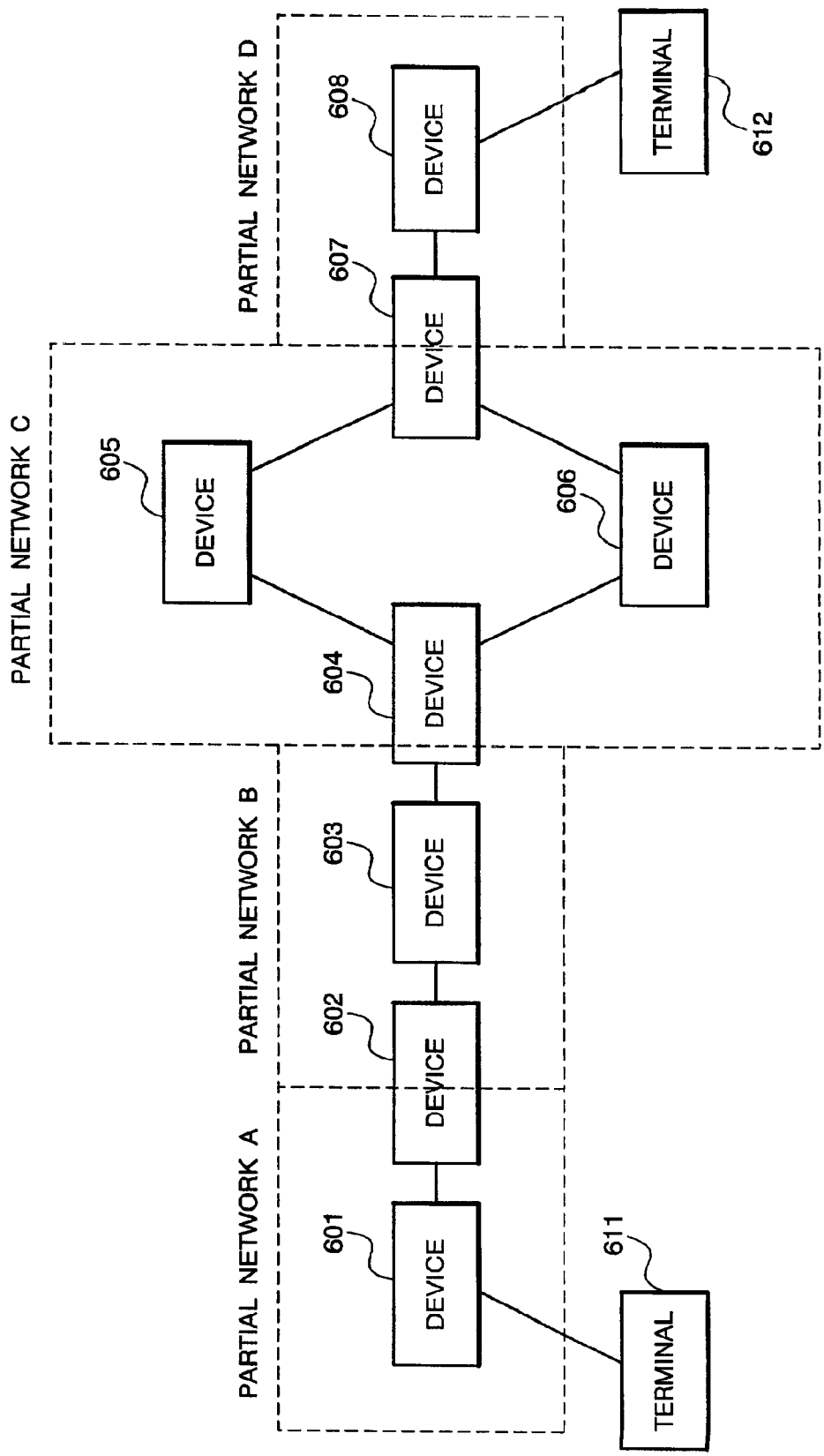
FIG. 8 is a block diagram showing one example of a packet transfer network constituted by the packet transfer devices according to the present invention shown in FIGS. 1 and 2.
Figure 14:
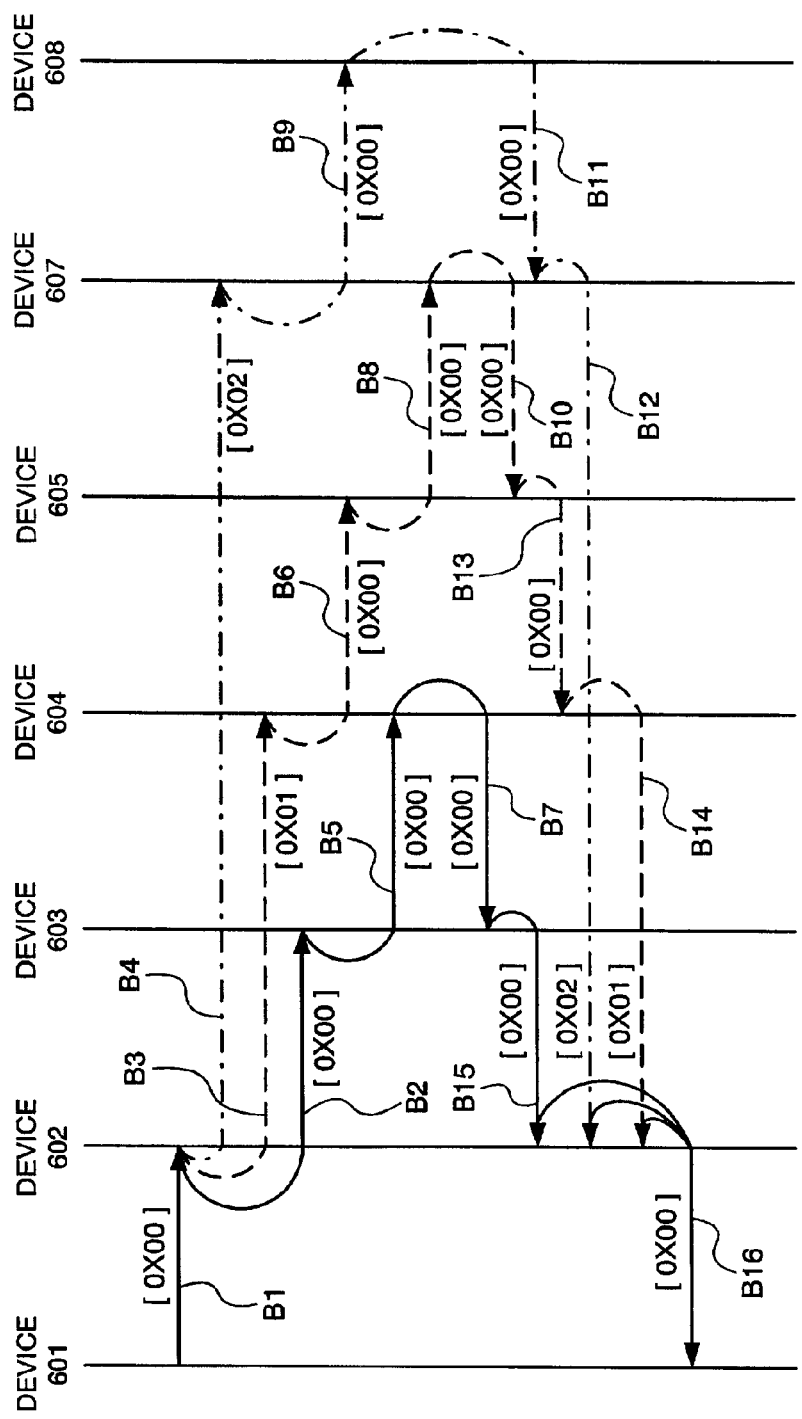
FIG. 14 is an operation flow chart, as to operation to be conducted in a cases where all the packet transfer devices in the packet transfer network illustrated in FIG. 8 return a label allocation packet as a response to a label request packet, describing LDP packet transfer/processing of the entire packet transfer network taking a length of a transfer delay time of each packet transfer device into consideration.
Figure 15:
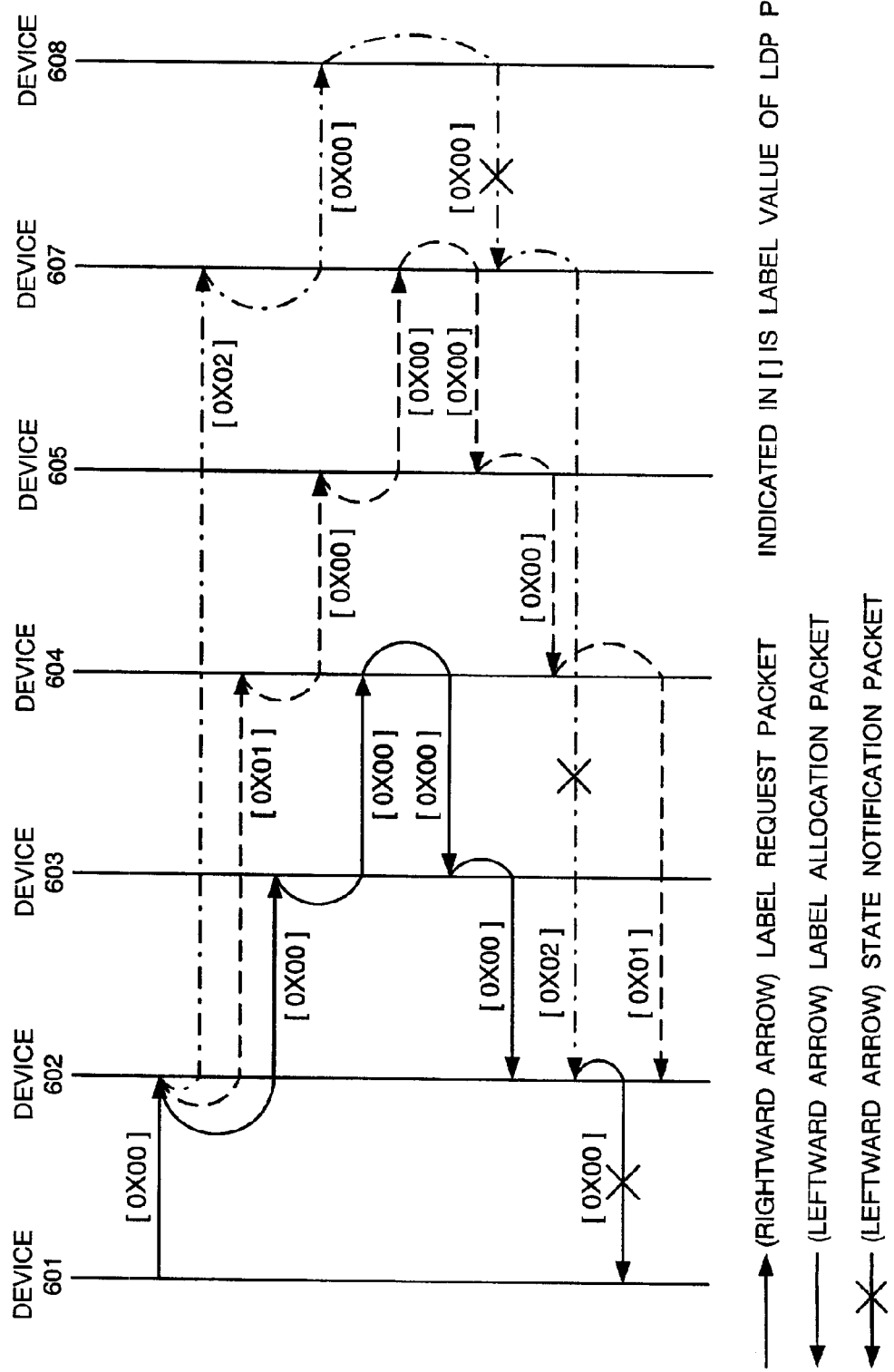
FIG. 15 is an operation flow chart, as to operation to be conducted in a case where the eighth packet transfer device in the packet transfer network illustrated in FIG. 8 returns a state notification packet as a response to a label request packet, describing LDP packet transfer/processing of the entire packet transfer network taking a length of a transfer delay time of each packet transfer device into consideration.
Figure 16:
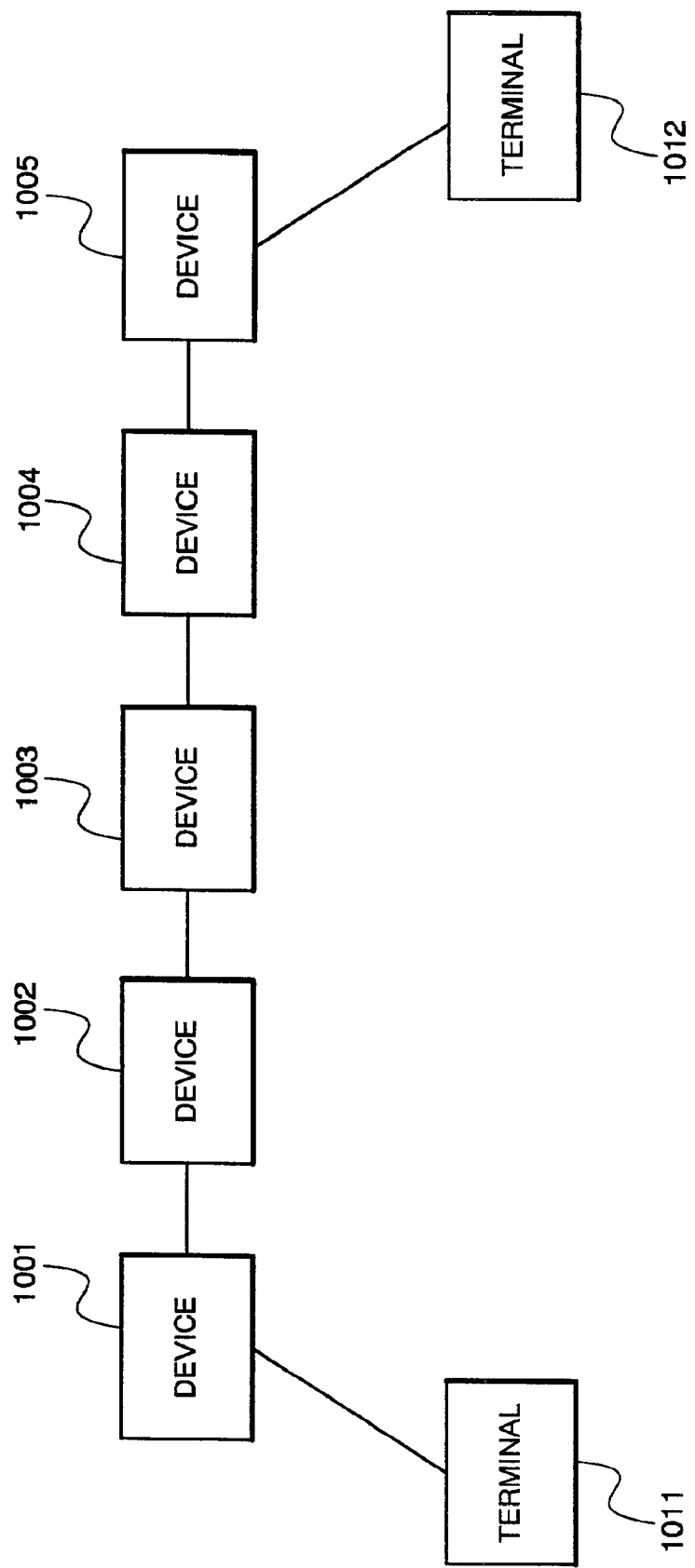
FIG. 16 is a block diagram showing one example of a packet transfer network for use in explaining a conventional packet transfer network.
Figure 17:
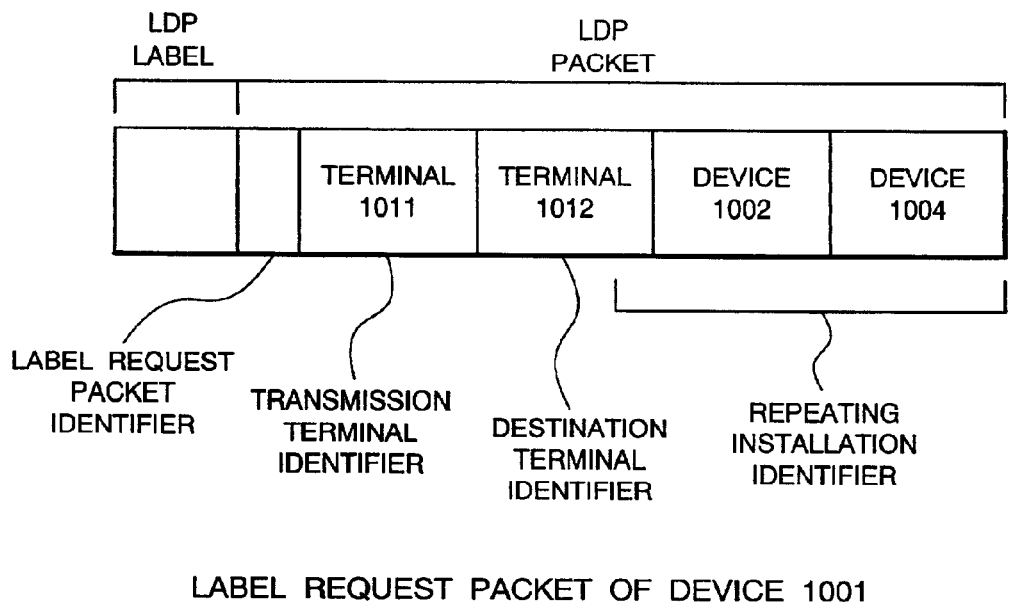
FIG. 17 is a diagram showing a kind and a packet format of an LDP packet to be transmitted and received by packet transfer devices constituting the packet transfer network illustrated in FIG. 16, which shows a format of a label request packet.
Figure 18:
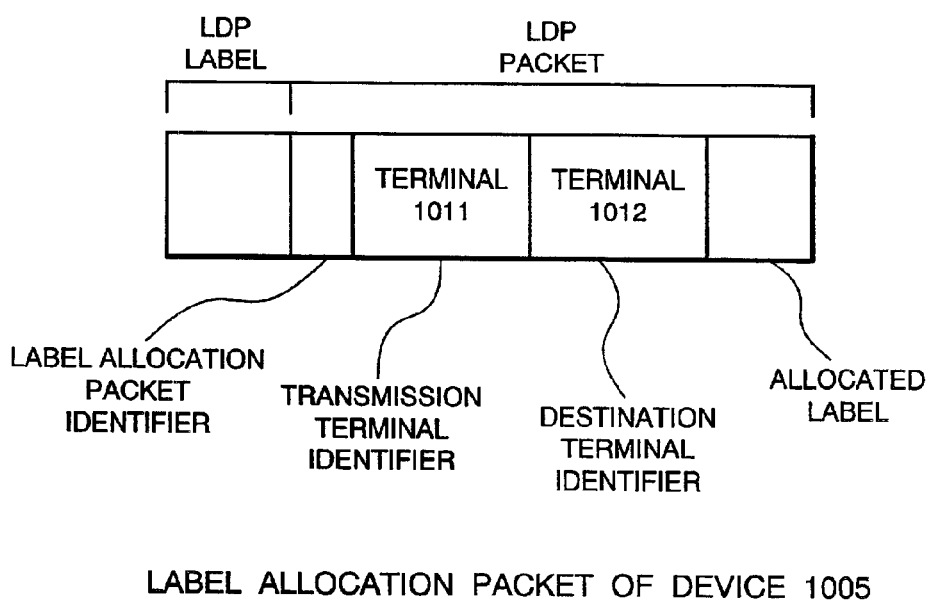
FIG. 18 is a diagram showing a kind and a packet format of an LDP packet to be transmitted and received by the packet transfer devices constituting the packet transfer network illustrated in FIG. 16, which shows a format of a label allocation packet.
Figure 19:
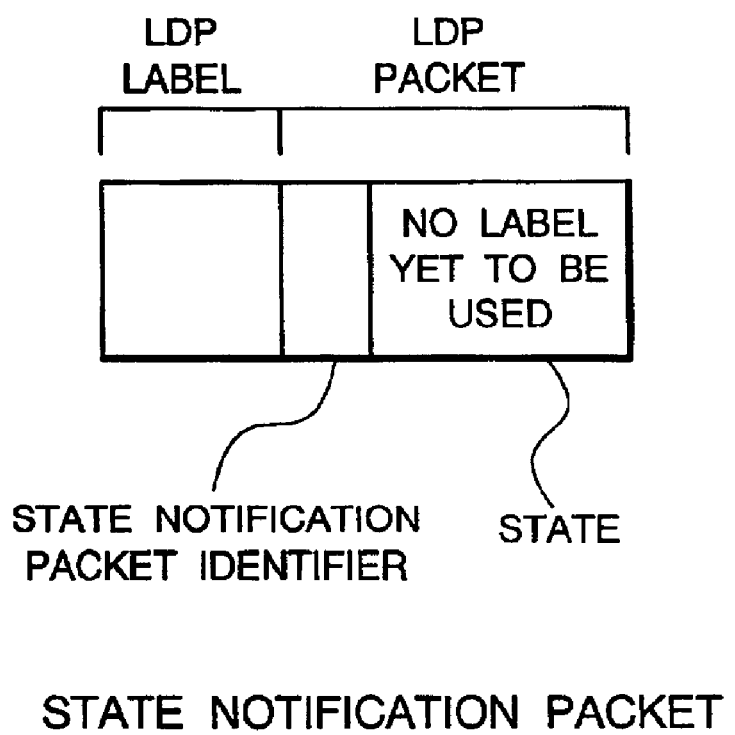
FIG. 19 is a diagram showing a kind and a packet format of an LDP packet to be transmitted and received by the packet transfer devices constituting the packet transfer network illustrated in FIG. 16, which shows a format of a state notification packet.
Figure 20:
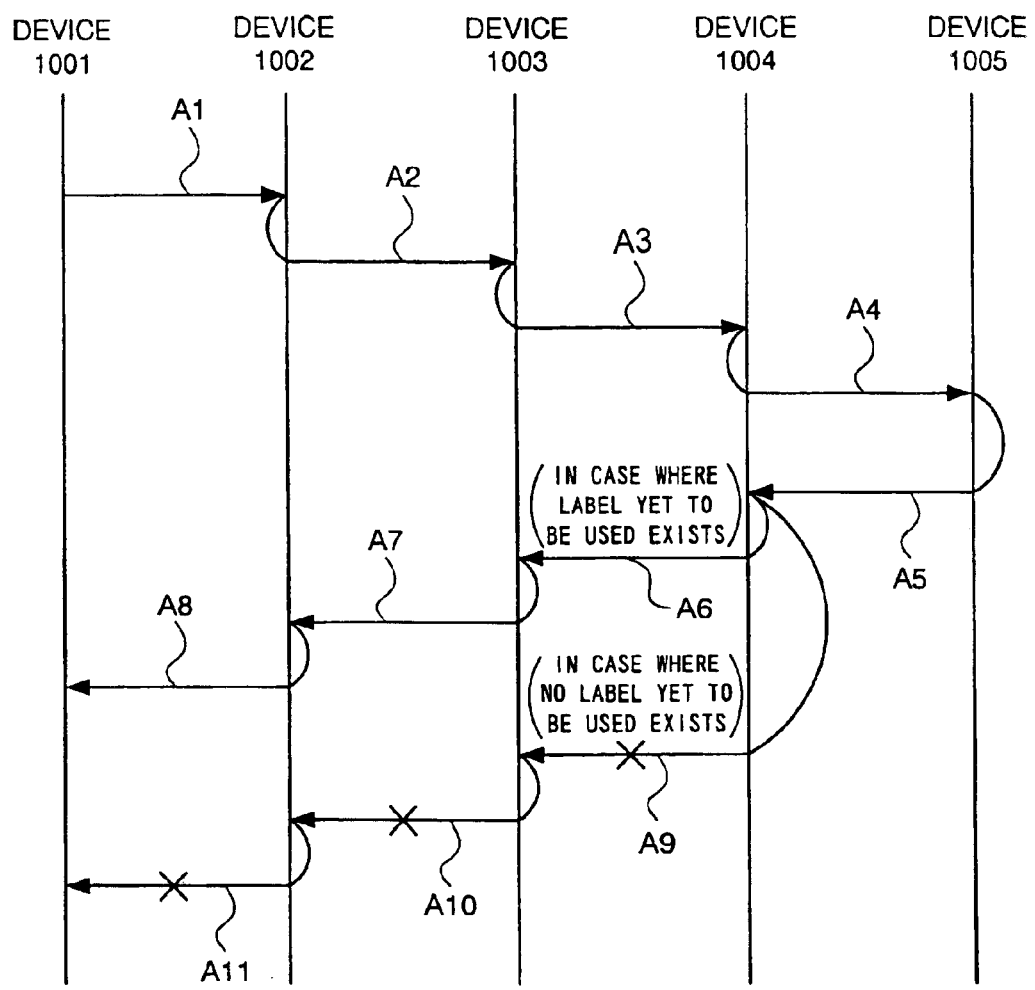
FIG. 20 is an operation flow chart for use in explaining operation of the packet transfer network illustrated in FIG. 16.

Here, FIGS. 14 and 15 show a relationship between a flow of LDP packet transfer/processing in the entire packet transfer network shown in FIG. 8 and time. FIG. 14 is a diagram describing, as to operation conducted when all the packet transfer devices return a label allocation packet as a response packet to a label request packet, LDP packet transfer/processing of the entire packet transfer network taking into consideration a length of a transfer delay time of each packet transfer device. FIG. 15 is a diagram describing, as to operation conducted when the eighth packet transfer device 608 returns a state notification packet as a response packet to a label request packet, LDP packet transfer/processing of the entire packet transfer network taking into consideration a length of a transfer delay time of each packet transfer device.

In the following, with reference to FIG. 8 in addition to FIG. 14, description will be made of operation to be conducted when all the packet transfer devices return a label allocation packet as a response packet to a label request packet.

First, since a path from the transmission terminal 611 to the reception terminal 612 is made up of the second, fourth and seventh packet transfer devices 602, 604 and 607, the first packet transfer device 601 attaches a label value of 0x00 to a label request packet [terminal 611, terminal 612, device 602/device 604/device 607] and outputs the obtained packet to a transmission path on the second packet transfer device 602 side (arrow B1 in FIG. 14).

The second packet transfer device 602 receives the label request packet at the adjacent LDP processing unit on the side of the first packet transfer device 601 to confirm existence of a label yet to be used at the label determination unit 206. Thereafter, since the fourth packet transfer device 604 and the seventh packet transfer device 607 are included as a repeating installation identifier, the second packet transfer device 602 outputs transmission requests for [device 602, device 604, (none)] to the adjacent LDP processing unit on the side of the third packet transfer device 603, [device 604, device 607, (none)] to the remote LDP processing unit for the fourth packet transfer device 604 and [device 607, terminal 612, (none)] to the remote LDP processing unit for the seventh packet transfer device 607 and attaches label values of 0x00, 0x01 and 0x02 to the label request packet at the respective adjacent LDP processing unit and the remote LDP processing units and output the obtained packets to the third packet transfer device 603 (arrows B2, B3 and B4 in FIG. 14).

Of these label request packets, the third packet transfer device 603 outputs the label request packets having the label values of 0x01 and 0x02 as they are to the transmission path on the fourth packet transfer device 604 side through the packet switch 107 (the arrows B3 and B4 in FIG. 14). As to the label request packet whose label value is 0x00, the third packet transfer device 603 receives it at the adjacent LDP processing unit on the side of the second packet transfer device 602 to confirm existence of a label yet to be used at the label determination unit 206. Thereafter, since no element exists in the repeating installation identifier, the label request packet with the label value of 0x00 is as it is output to the transmission path on the fourth packet transfer device 604 side (an arrow B5 in FIG. 14) while being multiplexed with the above packets having the label values of 0x01 and 0x02. At this time, the label request packet with the label value of 0x00 is output to the transmission path later than the label request packets with the label values of 0x01 and 0x02 because it is processed at the LDP processing unit 105.

The fourth packet transfer device 604 outputs, of the label request packets from the third packet transfer device 603, that having the label value of 0x02 as it is to the fifth packet transfer device 605 through the packet switch 107 (the arrow B4 in FIG. 14).

In addition, the fourth packet transfer device 604 receives the label request packet with the label value of 0x01 at the remote processing unit for the second packet transfer device 602 provided on the side of the third packet transfer device 603 to confirm existence of a label yet to be used at the label determination unit 206. Thereafter, the fourth packet transfer device 604 makes a request to the adjacent LDP processing unit on the side of the fifth packet transfer device 605 for transmitting a packet whose contents are the same as those of the received label allocation packet, so that the adjacent LDP processing unit on the side of the fifth packet transfer device 605 attaches a label value of 0x00 to the label request packet to output the obtained packet to the fifth packet transfer device 605 (an arrow B6 in FIG. 14).

Furthermore, the fourth packet transfer device 604 receives the label request packet with the label value of 0x00 at the adjacent LDP processing unit on the side of the third packet transfer device 603 and confirms that a label yet to be used exists on the transmission path on the third packet transfer device 603 side at the label determination unit 206 because the destination terminal identifier is its own device identifier. Thereafter, the fourth packet transfer device 604 makes a request to the adjacent LDP processing unit on the side of the third packet transfer device 603 for transmitting a label allocation packet whose allocated label has the label value in question, that is, 0x03 here. The adjacent LDP processing unit on the side of the third packet transfer device 603 attaches the label value of 0x00 to the label allocation packet and outputs the obtained packet to the third packet transfer device 603.

Time order of packet output from the fourth packet transfer device 604 will be the same as the described order.

In the fifth packet transfer device 605, the label request packet having the label value of 0x02 which has received from the fourth packet transfer device 604 passes through the packet switch 107 and output to the transmission path on the seventh packet transfer device 607 side (the arrow B4 in FIG. 14).

In addition, the fifth packet transfer device 605 receives the label request packet having the label value of 0x00 at the adjacent LDP processing unit on the side of the fourth packet transfer device 604 to confirm existence of a label yet to be used at the label determination unit 206. Thereafter, the fifth packet transfer device 605 makes a request to the adjacent LDP processing unit on the side of the seventh packet transfer device 607 for transmitting a packet whose contents are the same as those of the received label request packet, so that the adjacent LDP processing unit on the side of the seventh packet transfer device 607 attaches the label value of 0x00 to the label request packet and outputs the obtained packet to the seventh packet transfer device 607 (an arrow B8 in FIG. 14).

Time order of packet output from the fifth packet transfer device 605 will be the same as the described order.

The seventh packet transfer device 607 receives the label request packet having the label value of 0x02 received from the fifth packet transfer device 605 at the remote processing unit for the second packet transfer device 602 provided on the side of the fifth packet transfer device 605 to confirm existence of a label yet to be used at the label determination unit 206. Thereafter, the seventh packet transfer device 607 makes a request to the adjacent LDP processing unit on the side of the eighth packet transfer device 608 for transmitting a packet whose contents are the same as those of the received label request packet, so that the adjacent LDP processing unit on the side of the eighth packet transfer device 608 attaches the label value of 0x00 to the label request packet and outputs the obtained packet to the eighth packet transfer device 608 (an arrow B9 in FIG. 14).

The seventh packet transfer device 607 receives the label request packet with the label value of 0x00 at the adjacent LDP processing unit on the side of the fifth packet transfer device 605 and confirms that a label yet to be used exists on the transmission path on the fifth packet transfer device 605 side at the label determination unit 206 because the destination terminal identifier of the received label request packet is its own device identifier. Thereafter, the seventh packet transfer device 607 makes a request to the adjacent LDP processing unit on the side of the fifth packet transfer device 605 for transmitting a label allocation packet whose allocated label has the label value in question, that is, 0x04 here. The adjacent LDP processing unit on the side of the fifth packet transfer device 605 attaches the label value of 0x00 to the label allocation packet and outputs the obtained packet to the fifth packet transfer device 605 (an arrow B10 in FIG. 14).

The eighth packet transfer device 608 receives the label request packet with the label value of 0x00 received from the seventh packet transfer device 607 at the adjacent LDP processing unit on the side of the seventh packet transfer device 607 and confirms that a label yet to be used exists on the transmission path on the seventh packet transfer device 607 side at the label determination unit 206 because the destination terminal identifier of the received label request packet indicates a terminal connected to its own device. Thereafter, the eighth packet transfer device 608 makes a request to the adjacent LDP processing unit on the side of the seventh packet transfer device 607 for transmitting a label allocation packet having the label value in question, that is, 0x05 here, as an information element. The adjacent LDP processing unit on the side of the seventh packet transfer device 607 attaches the label value of 0x00 to the label allocation packet and outputs the obtained packet to the seventh packet transfer device 607 (an arrow B11) in FIG. 14).

Upon receiving a label allocation packet from the eighth packet transfer device 608, the seventh packet transfer device 607 pairs an allocated label value in the received packet and the label value of 0x04 selected on the transmission path on the fifth packet transfer device 605 side and registers the pair at the switch connection table 106. Then, the seventh packet transfer device 607 makes a request to the remote LDP processing unit for the second packet transfer device 302 provided on the side of the fifth packet transfer device 605 for transmitting a label allocation packet having an allocated label of an arbitrary value. The remote LDP processing unit for the second packet transfer device 302 attaches the label value of 0x02 to the label allocation packet and outputs the obtained packet to the fifth packet transfer device 605 (an arrow B12 in FIG. 14).

The fifth packet transfer device 605 passes the label allocation packet having the label value of 0x02 from the seventh packet transfer device 607 through the packet switch 107 as it is (the arrow B12 in FIG. 14).

In addition, the fifth packet transfer device 605 receives the packet having the label value of 0x00 at the adjacent LDP processing unit on the side of the seventh packet transfer device 607, selects a label value yet to be used on the transmission path on the side of the fourth packet transfer device 604 at the label determination unit 206, here, selects 0x04, and registers, at the switch connection table 106, the selected label value paired with the allocated label value in the received label allocation packet. The fifth packet transfer device 605 makes a request to the adjacent LDP processing unit on the side of the fourth packet transfer device 604 for transmitting a label allocation packet having the label value of 0x04 to be used on the transmission path on the fourth packet transfer device 604 side as an information element, so that the adjacent LDP processing unit on the fourth packet transfer device 604 side attaches the label value of 0x00 to the label allocation packet and outputs the obtained packet to the fourth packet transfer device 604 (an arrow B13 in FIG. 14).

The fourth packet transfer device 604 passes the label allocation packet having the label value of 0x02 from the fifth packet transfer device 605 through the packet switch 107 as it is (the arrow B12 in FIG. 14).

In addition, the fourth packet transfer device 604 receives the label allocation packet having the label value of 0x00 at the adjacent LDP processing unit on the side of the fifth packet transfer device 605, so that the label determination unit 206 pairs the allocated label value in the received label allocation packet and a label value of 0x03 selected on the transmission path on the side of the third packet transfer device 603 and registers the pair at the switch connection table 106. Then, the fourth packet transfer device 604 makes a request to the remote LDP processing unit for the second packet transfer device 602 provided on the side of the third packet transfer device 603 for transmitting a label allocation packet having an allocated label of an arbitrary value. The adjacent LDP processing unit on the third packet transfer device 603 side attaches the label value of 0x01 to the label allocation packet and outputs the obtained packet to the third packet transfer device 603 (an arrow B14 in FIG. 14).

The third packet transfer device 603 passes the label allocation packets having the label values of 0x02 and 0x01 from the fourth packet transfer device 604 through the packet switch 107 as they are (the arrows B12 and B14 in FIG. 14).

In addition, the third packet transfer device 603 receives the label allocation packet having the label value of 0x00 at the adjacent LDP processing unit on the side of the device 605, so that the label determination unit 206 pairs an allocated label value in the received label allocation packet with a label yet to be used on the transmission path on the side of the second packet transfer device 602, that is, with the label value of 0x03 here, and registers the pair at the switch connection table 106. Then, the third packet transfer device 603 makes a request to the adjacent LDP processing unit on the side of the second packet transfer device 602 for transmitting a label allocation packet having the label value of 0x03 of the second packet transfer device 602 side as an allocated label. The adjacent LDP processing unit on the second packet transfer device 602 side attaches the label value of 0x00 to the label allocation packet and outputs the obtained packet to the second packet transfer device 602 (an arrow B15 in FIG. 14).

Since the second packet transfer device 602 receives a label allocation packet from all the label values 0x00, 0x01 and 0x02 of label request packets which have been transmitted first, the label determination unit 206 registers, at the switch connection table 106, the allocated label value of 0x03 in the label allocation packet received at the adjacent LDP processing unit on the side of the third packet transfer device 603 paired with a label yet to be used on the transmission path on the first packet transfer device 601 side, that is, the label value of 0x03 here. In addition, the second packet transfer device 602 makes a request to the adjacent LDP processing unit on the first packet transfer device 601 side for transmitting a label allocation packet having the label value of 0x03 on the side of the first packet transfer device 601 as an information element. The adjacent LDP processing unit on the side of the first packet transfer device 601 attaches the label value of 0x00 to the label allocation packet and outputs the obtained packet to the first packet transfer device 601 (an arrow B16 in FIG. 14).

At the first packet transfer device 601, the label value of 0x03 in the label allocation packet received from the second packet transfer device 602 and the label value of the transmission path on the transmission terminal 611 side are registered in pair at the switch connection table 106.

In the above-described operation, all the first, second, third, fourth, fifth, seventh and eighth packet transfer devices 601, 602, 603, 604, 605, 607 and 608 return label allocation packets to all the label request packets. Accordingly, at each switch connection table 106 of every packet transfer device, connection information for the communication between the first terminal 611 and the second terminal 612 is stored. As a result, communication packets will be hereinafter transferred between the first terminal 611 and the second terminal 612 according to the connection information.

Apart from the above operation, when at least one of the first, second, third, fourth, fifth, seventh and eighth packet transfer devices 601, 602, 603, 604, 605, 607 and 608 returns a state notification packet as a response packet to a label request packet, the state notification packet will be transferred to the first packet transfer device 601. Accordingly, the first packet transfer device 601 recognizes that a label request output by itself is refused. One example of such operation is shown in FIG. 15.

The above-described LDP packet transfer method of each packet transfer device has two kinds. One is passing a received LDP packet through the packet switch 107. The other is receiving a received LDP packet at an adjacent LDP processing unit or a remote LDP processing unit and after processing the packet at a label determination unit, outputting the same through the adjacent LDP processing unit or the remote LDP processing unit. The former method of passing a packet through the packet switch 107 has a short delay time for transfer because a packet switch is in general implemented by hardware. On the other hand, the latter method has a long delay time for transfer because processing of confirming a kind and contents of an LDP packet and searching/managing label use conditions is in general realized by software. Therefore, operation conducted when all the devices return a label allocation packet as a response to a label request packet will be described as shown in FIG. 14 when taking a length of a transfer delay time of each device in LDP packet transfer/processing of the entire network into consideration. Operation conducted when the eighth packet transfer device 608 returns a state notification packet as a response packet to a label request packet will be described as shown in FIG. 15 when taking a length of a transfer delay time of each device in LDP packet transfer/processing of the entire network into consideration.

As described in the foregoing, the present invention produces such effects as recited in the following.

First, since a path through which packets pass is divided into a plurality paths and each packet transfer device at a division point is provided with a path for directly transferring an LDP packet, thereby individually generating a label request packet and directly transferring an individual label request packet to a packet transfer device at a division point, a label request packet arrives earlier on a path to make a label request packet processing starting time at each packet transfer device earlier.

Secondly, since a path through which packets pass is divided into a plurality of paths and a path for directly receiving an LDP packet from each packet transfer device at a division point is provided, thereby individually receiving a response packet (label allocation packet or a state notification packet) which is a result of label request processing at each division directly from a packet transfer device at a division point and determining the result, notification of results to a packet transfer device as a source of request and to a terminal can be given earlier.

Thirdly, because of the second effect, allowance of a label request is notified to a packet transfer device as a requesting source earlier, so that communication using the label in question starts earlier.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. In a packet transfer network for conducting packet transfer between a first terminal and a second terminal through a plurality of packet transfer devices provided between the first terminal and second terminal, a label request packet transmission method of transmitting an original label request packet for use in determining a label to be used among said plurality of packet transfer devices for the purpose of said packet transfer from a transmission side packet transfer device connected to said first terminal and a reception side packet transfer device connected to said second terminal, comprising the steps of:

dividing said packet transfer network into a plurality of sections, dividing said original label request packet into a plurality of divisional label request packets each for each said section and transmitting the plurality of divisional label request packets in parallel to each section.

2. The label request packet transmission method as set forth in claim 1, wherein division into said plurality of label request packets each for each said section is conducted by a specific representative packet transfer device at a section to which said transmission side packet transfer device belongs.

3. The label request packet transmission method as set forth in claim 2, wherein said specific representative packet transfer device transmits said plurality of divisional label request packets each for each said section directly to a plurality of other representative packet transfer devices in the remainder of the plurality of sections in parallel to each other.

4. The label request packet transmission method as set forth in claim 2, wherein said specific representative packet transfer device transmits said plurality of divisional label request packets each for each said section directly to a plurality of other representative packet transfer devices in the remainder of the plurality of sections in parallel to each other, and each said representative packet transfer device is disposed at a starting point of a path in the section to which the representative packet transfer in question belongs.

5. The label request packet transmission method as set forth in claim 2, wherein said specific representative packet transfer device transmits said plurality of divisional label request packets each for each said section directly to a plurality of other representative packet transfer devices in the remainder of the plurality of sections in parallel to each other, and each said representative packet transfer device is disposed at boundaries between said sections adjacent to each other.

6. The label request packet transmission method as set forth in claim 2, wherein said specific representative packet transfer device transmits said plurality of divisional label request packets each for each said section directly to a plurality of other representative packet transfer devices in the remainder of the plurality of sections in parallel to each other, and each of said plurality of other representative packet transfer devices, upon receiving a label request pocket addressed to the device of its own, sequentially transmits, within a section to which its own device belongs, the received label request packet to a packet transfer device belonging to the section in question.

7. A packet transfer network for conducting packet transfer between a first terminal and a second terminal through a plurality of packet transfer devices provided between the terminals, in which a transmission side packet transfer device connected to said first terminal transmits an original label request packet for use in determining a label to be used among said plurality of packet transfer devices for the purpose of said packet transfer to a reception side packet transfer device connected to said second terminal, wherein said packet transfer network is divided into a plurality of partial networks, and a specific representative packet transfer device in a partial network to which said transmission side packet transfer device belongs includes:

reception means for receiving said original label request packet from said transmission side packet transfer device, and transmission means for dividing the received original label request packet into a plurality of label request packets each for each said partial network and transmitting the divisional packets to each partial network in parallel.

8. The packet transfer network as set forth in claim 7, wherein said transmission means of said specific representative packet transfer device transmits said plurality of divisional label request packets each for each said partial network directly to a plurality of other representative packet transfer devices in the remainder of the plurality of partial networks in parallel to each other.

9. The packet transfer network as set forth in claim 8, wherein each said representative packet transfer device is disposed at a starting point of a path in the partial network to which the representative packet transfer in question belongs.

10. The packet transfer network as set forth in claim 8, wherein each said representative packet transfer device is disposed at boundaries between said partial networks adjacent to each other.

11. The packet transfer network as set forth in claim 8, wherein each of said plurality of other representative packet transfer devices includes:

reception means for receiving a label request packet addressed to the device of its own, and transmission means for sequentially transmitting, within a partial network to which its own device belongs, the received label request packet to a packet transfer device belonging to the partial network in question.

12. In a packet transfer network for conducting packet transfer between a first terminal and a second terminal through a plurality of packet transfer devices provided between the terminals, a label determination method of determining a label to be used among said plurality of packet transfer devices for the purpose of said packet transfer, comprising the steps of:

dividing said packet transfer network into a plurality of sections, dividing an original label request packet for use in determining a label to be used among said plurality of packet transfer devices for the purpose of said packet transfer into a plurality of label request packets each for each said section and transmitting the divisional packets to each section in parallel, and individually notifying a result of each section which is a response corresponding to said plurality of divisional label request packets.

13. The label determination method as set forth in claim 12, wherein a result of each said section is all a label allocation packet indicative of an affirmative acknowledgment.

14. The label determination method as set forth in claim 12, wherein at least one of results of each said section is a state notification packet indicative of a negative acknowledgment.

15. In a packet transfer network for conducting packet transfer between a first terminal and a second terminal through a plurality of packet transfer devices provided between the terminals, a label determination method of determining a label to be used among said plurality of packet transfer devices for the purpose of said packet transfer, comprising the steps of:

dividing said packet transfer network into a plurality of partial networks, transmitting an original label request packet for use in determining a label to be used among said plurality of packet transfer devices for the purpose of said packet transfer from a transmission side packet transfer device connected to said first terminal to a reception side packet transfer device connected to said second terminal, receiving said original label request packet at a specific representative packet transfer device in a partial network to which said transmission side packet transfer device belongs, at the specific representative packet transfer device, dividing the original label request packet into a plurality of label request packets each for each said partial network, directly transmitting said plurality of divisional label request packets from said specific representative packet transfer device to a plurality of other representative packet transfer devices in the remainder of the plurality of partial networks in parallel to each other, at each of said plurality of other representative packet transfer devices, receiving a label request packet addressed to the device of its own, sequentially transmitting the received label request packet from each of said representative packet transfer devices to a packet transfer device in a partial network to which the representative packet transfer device in question belongs, at each packet transfer device in each partial network, receiving a label request packet transmitted from a representative packet transfer device of a partial network to which the packet transfer device in question belongs, transmitting a response packet to the received label request packet from each packet transfer device in each partial network to a representative packet transfer device of a partial network to which the packet transfer device in question belongs, at each of said plurality of other representative packet transfer devices, receiving said response packet from a packet transfer device in a partial network to which the representative packet transfer device in question belongs, from each of said plurality of other representative packet transfer devices, directly transmitting said received response packet to said specific representative packet transfer device, at said specific representative packet transfer device, receiving said response packet from each of said plurality of other representative packet transfer devices, at said specific representative packet transfer device, synthesizing said received response packets collected and transmitting the synthesized response packet to said transmission side packet transfer device, at said transmission side packet transfer device, receiving said synthesized response packet, and at said transmission side packet transfer device, returning a result of determination on a label request based on the received synthesized response packet to said first terminal.

16. The label determination method as set forth in claim 15, wherein said response packets are all label allocation packets indicative of an affirmative acknowledgment.

17. The label determination method as set forth in claim 15, wherein at least one of said response packets is a state notification packet indicative of a negative acknowledgment.

18. A packet transfer device for use in a packet transfer network for conducting packet transfer between a first terminal and a second terminal through a plurality of packet transfer devices provided between the terminals, said packet transfer device provided between first and second transmission paths for conducting LDP (Label Distribution Protocol) processing, comprising:

a first LDP multiplexing and separation unit connected to said first transmission path for conducting LDP multiplexing and separation, a second LDP multiplexing and separation unit connected to said second transmission path for conducting LDP multiplexing and separation, a packet switch provided between said first LDP separation unit and said second LDP processing unit, a switch connection table connected to the packet switch for controlling a switch connection state of said packet switch, and an LDP processing unit connected to said first and said second LDP multiplexing and separation units and said switch connection table for processing an LDP packet separated at said first LDP multiplexing and separation unit to multiplex a plurality of LDP packets in parallel for each of a plurality of divisional sections obtained by dividing said packet transfer network and sending the multiplexed packet to said second LDP multiplexing and separation unit, as well as updating said switch connection table.

19. The packet transfer device as set forth in claim 18, wherein said LDP processing unit includes:

a first adjacent LDP processing unit connected to said first LDP multiplexing and separation unit for interpreting an LDP packet separated at the first LDP multiplexing and separation unit and outputting the received contents, a label determination unit connected to the first adjacent LDP processing unit and said switch connection table for outputting a transmission request according to said received contents from the first adjacent LDP processing unit and an internal state, as well as determining a label value to be used on said first and said second transmission paths to register a combination of the values at said switch connection table, a second adjacent LDP processing unit connected to the label determination unit for generating and outputting an LDP packet according to said transmission request from the label determination unit, at least one remote LDP processing unit connected to said label determination unit for generating and outputting an LDP packet according to said transmission request from the label determination unit, and a packet multiplexing and separation unit connected to said second adjacent LDP processing unit, said at least one remote LDP processing unit and said second LDP multiplexing and separation unit for multiplexing an LDP packet from said second adjacent LDP processing unit and an LDP packet from said at least one remote LDP processing unit and sending the multiplexed packet to said second LDP multiplexing and separation unit.

20. The packet transfer device as set forth in claim 19, wherein as to an LDP packet from said second LDP multiplexing and separation unit, said packet multiplexing and separation unit allocates LDP packets to said second adjacent LDP processing unit and said at least one remote LDP processing unit according to a label value, said second adjacent LDP processing unit interprets an LDP packet allocated at said packet multiplexing and separation unit and notifies the contents of the received packet to said label determination unit, said at least one remote LDP processing unit interprets an LDP packet allocated at said packet multiplexing and separation unit and notifies the contents of the received packet to said label determination unit, said label determination unit sends a transmission request to said first adjacent LDP processing unit according to the received contents from said second adjacent LDP processing unit and said at least one remote LDP processing unit and an internal state, and said first adjacent LDP processing unit sends an LDP packet to said first LDP multiplexing and separation unit according to a transmission request from said label determination unit.

\* \* \* \* \*